US009977921B2

(12) United States Patent
Sprague et al.

(10) Patent No.: US 9,977,921 B2
(45) Date of Patent: May 22, 2018

(54) SECURITY SYSTEMS AND METHODS FOR ENCODING AND DECODING DIGITAL CONTENT

(71) Applicant: ESW Holdings, Inc., Austin, TX (US)

(72) Inventors: Steven Sprague, Richmond, MA (US); Michael Sprague, New York, NY (US)

(73) Assignee: ESW Holdings, Inc., Austin, TX (US)

( * ) Notice: Subject to any disclaimer, the term of this patent is extended or adjusted under 35 U.S.C. 154(b) by 0 days. days.

(21) Appl. No.: 14/710,402

(22) Filed: May 12, 2015

(65) Prior Publication Data

US 2017/0200023 A1 Jul. 13, 2017

Related U.S. Application Data

(60) Division of application No. 13/610,636, filed on Sep. 11, 2012, now Pat. No. 9,043,866, which is a (Continued)

(51) Int. Cl.
*G06F 21/00* (2013.01)
*G06F 21/62* (2013.01)
(Continued)

(52) U.S. Cl.
CPC ........ *G06F 21/6254* (2013.01); *G06F 21/602* (2013.01); *H04L 63/20* (2013.01)

(58) Field of Classification Search
CPC .. G06F 21/00; G06F 21/6263; G06F 21/6254; G06F 21/602; H04L 63/105; H04L 63/20
See application file for complete search history.

(56) References Cited

U.S. PATENT DOCUMENTS 6,263,313 B1 7/2001 Milsted et al.
7,036,020 B2 4/2006 Thibadeau
(Continued)

FOREIGN PATENT DOCUMENTS

EP 2 120 172 A1 11/2009
EP 2 771 834 9/2014
WO WO 2013/074245 5/2013

OTHER PUBLICATIONS

Final Office Action in U.S. Appl. No. 13/610,636, entitled "Security Systems and Methods for Encoding and Decoding Digital Content," dated Oct. 28, 2014.

(Continued)

*Primary Examiner* — Don Zhao

(57) ABSTRACT

Systems and methods may be provided for masking data on public networks. At a publishing node, the system may monitor data input fields in a webpage, and intercept and encode content, such as text, images, and video input at the data input fields, prior to the content being posted online on a public service provider's website. A policy may be defined to control which users are permitted access to a key to decode the encoded content. The policy may defer to a third party policy node in determining key access. An account for a controlling entity, such as a guardian or employer, may be configured to control the encoding status of posts made by another. The controlling entity may control who has key access to decode posts made by the other account. The guardian account may be configured to have preemptive rights over posting decisions made by the minor.

20 Claims, 23 Drawing Sheets

Related U.S. Application Data continuation-in-part of application No. 13/295,686, filed on Nov. 14, 2011, now Pat. No. 9,047,489.

(51) Int. Cl.
*H04L 29/06* (2006.01)
*G06F 21/60* (2013.01)

(56) References Cited

U.S. PATENT DOCUMENTS 7,426,747 B2 9/2008 Thibadeau
8,130,947 B2 3/2012 Kerschbaum et al.
8,413,046 B1 * 4/2013 Mocanu ............ G06F 17/30905 715/200
8,538,020 B1 9/2013 Miller
8,873,751 B2 10/2014 Knox et al.
9,043,866 B2 5/2015 Sprague et al.
9,350,535 B2 5/2016 Hamilton
9,385,999 B2 7/2016 Kanungo
9,444,794 B2 9/2016 Giladi
2002/0029340 A1 3/2002 Pensak et al.
2002/0078361 A1 * 6/2002 Giroux ................ H04L 63/0428 713/183
2003/0037232 A1 * 2/2003 Bailiff ................ G06F 21/6263 713/153
2003/0123665 A1 7/2003 Dunstan
2004/0117655 A1 6/2004 Someshwar
2004/0128552 A1 7/2004 Toomey
2006/0218086 A1 * 9/2006 Campbell .............. G06Q 10/10 705/39
2007/0061863 A1 3/2007 Rajasekaran
2007/0206788 A1 9/2007 Hagiwara et al.
2008/0016099 A1 1/2008 Ikeda
2008/0066185 A1 3/2008 Lester et al.
2008/0140410 A1 * 6/2008 Rivanichayaphong G06F 17/30896 704/270
2008/0301444 A1 12/2008 Kim et al.
2009/0150219 A1 6/2009 Headings et al.
2009/0158399 A1 6/2009 Cooley et al.
2009/0171805 A1 * 7/2009 Gould .................... G06Q 20/40 705/26.1
2009/0234876 A1 9/2009 Schigel et al.
2009/0259532 A1 * 10/2009 Bergstraesser ..... G06Q 30/0241 705/14.4
2009/0307745 A1 12/2009 Inose
2010/0082798 A1 * 4/2010 Bhogal ................... A63F 13/12 709/224
2010/0211515 A1 8/2010 Woodings et al.
2011/0099482 A1 4/2011 Koved et al.
2011/0113468 A1 5/2011 Waissbein et al.
2011/0145571 A1 6/2011 Schmidt-Karaca et al.
2011/0170692 A1 7/2011 Konrad et al.
2011/0209193 A1 8/2011 Kennedy
2011/0219427 A1 9/2011 Hito et al.
2011/0252118 A1 10/2011 Pantos et al.
2011/0271173 A1 11/2011 Aüt-Mokhtar et al.
2012/0023332 A1 1/2012 Gorodyansky
2012/0137122 A1 5/2012 Lu et al.
2012/0174121 A1 7/2012 Treat et al.
2012/0216133 A1 * 8/2012 Barker .................. G06F 21/629 715/760
2012/0260108 A1 10/2012 Lee
2012/0311326 A1 12/2012 Kim et al.
2012/0311658 A1 12/2012 Dozier
2012/0324242 A1 12/2012 Kirsch
2013/0125201 A1 5/2013 Sprague
2013/0125202 A1 5/2013 Sprague
2013/0125247 A1 5/2013 Sprague
2013/0163758 A1 6/2013 Swaminathan et al.
2013/0166906 A1 6/2013 Swaminathan et al.
2014/0140506 A1 5/2014 Saremi et al.
2015/0235011 A1 8/2015 Swaminathan et al.
2016/0127326 A1 5/2016 Lin

OTHER PUBLICATIONS

Final Office Action in U.S. Appl. No. 13/610,657, entitled "Security Systems and Methods for Encoding and Decoding Digital Content," dated Jul. 10, 2014.
Non-Final Office Action for U.S. Appl. No. 13/295,686, entitled "Security Systems and Methods for Social Networking," dated Sep. 18, 2014.
Non-Final Office Action for U.S. Appl. No. 13/295,686, entitled "Security Systems and Methods for Social Networking," dated Feb. 27, 2013.
Non-Final Office Action for U.S. Appl. No. 13/610,636, entitled "Security Systems and Methods for Encoding and Decoding Digital Content," dated Mar. 28, 2013.
Non-Final Office Action for U.S. Appl. No. 13/610,657, entitled "Security Systems and Methods for Encoding and Decoding Digital Content," dated Nov. 20, 201.
Notice of Allowance for U.S. Appl. No. 13/295,686, entitled "Security Systems and Methods for Social Networking," dated Apr. 3, 2015.
Notice of Allowance for U.S. Appl. No. 13/610,636, entitled "Security Systems and Methods for Encoding and Decoding Digital Content," dated Apr. 7, 2015.
Notice of Allowance for U.S. Appl. No. 13/610,657, entitled "Security Systems and Methods for Encoding and Decoding Digital Content," dated Jan. 14, 2015.
Notification Concerning Transmittal of International Preliminary Report on Patentability in International Application No. PCT/US2012/060828; dated May 30, 2014, entitled: "Security Systems and Methods for Encoding and Decoding Digital Content".
Supplemental Notice of Allowance dated May 1, 2015, mailed in U.S. Appl. No. 13/295,686, pp. 1-3.
Notice of Allowance dated Apr. 3, 2015, mailed in U.S. Appl. No. 13/295,686, pp. 1-52.
Response to Non-Final Office Action dated Sep. 18, 2014, as filed in U.S. Appl. No. 13/295,686 on Feb. 23, 2015, pp. 1-18.
Non-Final Office Action dated Sep. 18, 2014, mailed in U.S. Appl. No. 13/295,686, pp. 1-83.
Request for Continued Examination (RCE) and RCE Submission as filed in U.S. Appl. No. 13/295,686 dated Apr. 8, 2014, pp. 1-19.
Final Office Action dated Oct. 8, 2013, mailed in U.S. Appl. No. 13/295,686, pp. 1-82.
Response to Non-Final Office Action dated Feb. 27, 2013, as filed in U.S. Appl. No. 13/295,686 on Jun. 27, 2013, pp. 1-17.
Non-Final Office Action dated Feb. 27, 2013, mailed in U.S. Appl. No. 13/295,686, pp. 1-48.
Notice of Allowance dated Apr. 7, 2015, mailed in U.S. Appl. No. 13/610,636, pp. 1-44.
Terminal Disclaimer Review Decision dated Mar. 12, 2015, mailed in U.S. Appl. No. 13/610,636, 1 page.
Request for Continued Examination (RCE) and RCE Submission as filed in U.S. Appl. No. 13/610,636 dated Mar. 2, 2015, pp. 1-17.
Final Office Action dated Oct. 28, 2014, mailed in U.S. Appl. No. 13/610,636, pp. 1-63.
Response to Non-Final Office Action dated Mar. 28, 2014, as filed in U.S. Appl. No. 13/610,636 on Jul. 25, 2014, pp. 1-13.
Non-Final Office Action dated Mar. 28, 2014, mailed in U.S. Appl. No. 13/610,636, pp. 1-64.
Response to Requirement for Restriction dated Dec. 13, 2013, as filed in U.S. Appl. No. 13/610,636 on Feb. 13, 2014, pp 1-7.
Requirement for Restriction dated Dec. 13, 2013, mailed in U.S. Appl. No. 13/610,636, pp. 1-7.
Response to Amendment under 37 C.F.R. § 1.312 dated Mar. 16, 2015, mailed in U.S. Appl. No. 13/610,657, pp. 1-3.
Amendment after Allowance under 37 C.F.R. § 1.312 as filed in U.S. Appl. No. 13/610,657, pp. 1-10.
Notice of Allowance dated Jan. 14, 2015, mailed in U.S. Appl. No. 13/610,657, pp. 1-41.
Request for Continued Examination (RCE) and RCE Submission as filed in U.S. Appl. No. 13/610,657 dated Nov. 10, 2014, pp. 1-14.
Final Rejection dated Jul. 10, 2014, mailed in U.S. Appl. No. 13/610,657, pp. 1-47.

(56) References Cited

OTHER PUBLICATIONS

Terminal Disclaimer Review Decision dated May 6, 2014, mailed in U.S. Appl. No. 13/610,657, p. 1.
Response to Non-Final Office Action dated Nov. 20, 2013, as filed in U.S. Appl. No. 13/610,657 on May 5, 2014, pp. 1-11.
Non-Final Office Action dated Nov. 20, 2013, mailed in U.S. Appl. No. 13/610,657, pp. 1-102.
Notice of Allowance dated Dec. 14, 2017, mailed in U.S. Appl. No. 14/689,965, pp. 1-33.
Response to Non-Final Office Action dated Jun. 1, 2017, as filed in U.S. Appl. No. 14/689,965 on Nov. 1, 2017, pp. 1-26.
Response to Non-Final Office Action dated May 23, 2017, as filed in U.S. Appl. No. 14/710,451 on Nov. 24, 2017, pp. 1-15.
Terminal Disclaimer and Terminal Disclaimer Approval dated Dec. 7, 2017 in U.S. Appl. No. 14/689,965, pp. 1-3.
Non-Final Office Action dated Jun. 1, 2017, mailed in U.S. Appl. No. 14/689,965, pp. 1-23.
Non-Final Office Action dated May 23, 2017, mailed in U.S. Appl. No. 14/710,451, pp. 1-21.

* cited by examiner

100

100

100

1320 domain accounts     [back]

Lorem ipsum dolor sit amet, nulla lectus vehicula a vitae. Velit donec neque lacinia quam mauris ipsum, luctus vitae id felis fringilia mauris dui. Nibh lobortis platea dolor mattis justo.

domain profile scrambls.com

[Add domain] — 1322 registered accounts

[ ] [search]   1324

| | user | screen name | status |
|---|---|---|---|
| ✓ | msprague@scrambls.com | michael sprague | active |
| ✓ | sjain@scrambls.com | Doc jain | active |
| | stidnam@scrambls.com | Simon | active |
| | ssprague@scrambls.com | ssprague@scrambls.com | active |
| | egreen@scrambls.com | EdGreen | suspended |
| | smilam@scrambls.com | sashaM | active |
| | smccary@scrambls.com | Scott | active |
| | vram@scrambls.com | vram@scrambls.com | suspended |
| | mparsons@scrambls.com | mparsons | active |
| | mwheeler@scrambls.com | Mike W | pending invitation |
| | nolanb@scrambls.com | NB | pending invitation |
| | helpdesk@scrambls.com | Help Desk | active |

[suspend selected] [delete selected] [Invite new users]

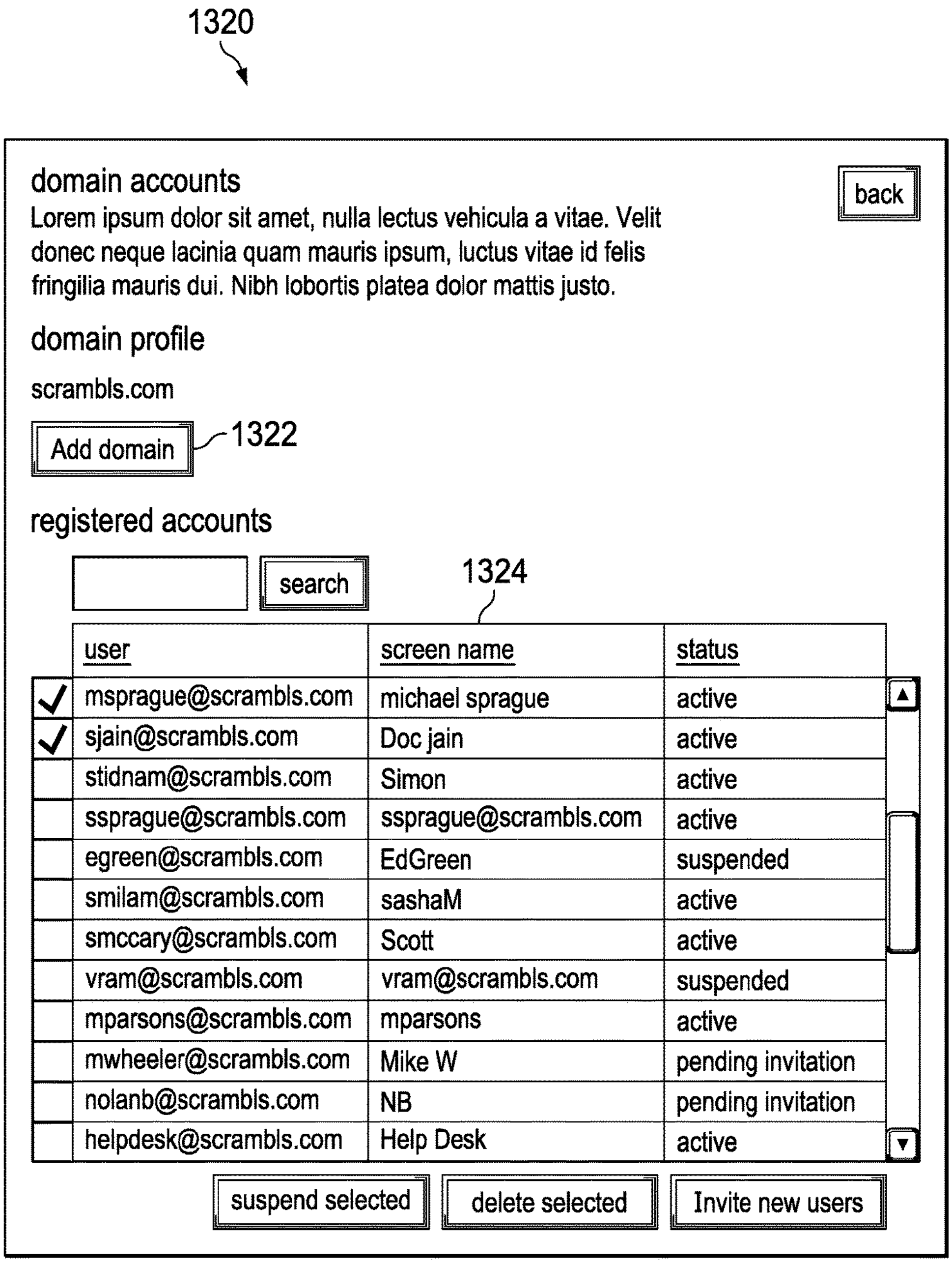

FIG. 13E

SECURITY SYSTEMS AND METHODS FOR ENCODING AND DECODING DIGITAL CONTENT

RELATED APPLICATION(S)

This application is a divisional of U.S. application Ser. No. 13/610,636, filed Sep. 11, 2012, which is a continuation-in-part of U.S. application Ser. No. 13/295,686, filed Nov. 14, 2011. This application is related to U.S. patent application Ser. No. 13/610,657 entitled "Security Systems and Methods for Encoding and Decoding Digital Content" by Steven Sprague and Michael Sprague, filed on Sep. 11, 2012. The entire teachings of the above application(s) are incorporated herein by reference.

BACKGROUND OF THE INVENTION

The evolution of the web has brought content submissions to the forefront of public online services. User submissions including comments, status updates, images, and the like are now commonplace in virtually all public online services, including social networking sites, online news articles, and blogs. A vast majority of material is now provided by end-users rather than webmasters. As a webmaster, one has the ability to modify or remove content at will, or to reserve access to a select community of viewers. An end-user user posting into a web service, however, normally gives up all these rights as soon as the content is uploaded.

Users of a public online service who share content on the site can create serious risks to their own privacy. Not only do social networking site users face privacy concerns with respect to the social network site itself having access to, and possibly ownership of, content posted by its users, but third party applications and advertisers integrated/linked into the social networking site may also have access to such content. Social networking site APIs can allow integration of third-party software and give third-party developers access to user data. While these open interfaces enable site enhancements, there is an important privacy trade off, which many site users do not appreciate. Thus, social networking sites can pose serious privacy risks to their users by exposing user data to third-party developers and advertisers. To allay fears of privacy violations, some social networking sites provide users with some access control settings to place restrictions on who may view their personal information. The introduction of open APIs to social networks, however, enables such access control preferences to be circumvented, thus making user data vulnerable to data mining and other privacy issues.

SUMMARY OF THE INVENTION

Systems and methods may be provided in which end-users may encode (e.g. encrypt, mask, transform) content posted to a public Internet service. The systems and methods may enable end-users to control a policy that governs access to that content. Private data posted by end-users on public networks, such as social networking sites or publishing sites that allow end-users to post comments, may be encoded by the posting end-user. A browser plugin may be provided on a client system to encode the posted data before it is available online and automatically decode the encoded posts into clear text for those viewers that are granted the key. In this way, data security and data control may be provided for end-user posting online. Access to the posted data may be restricted to a select group of viewers. Data that has already been posted may be destroyed, for example, by deleting the decryption key.

Content, such as a written post or image, is often submitted through a form hosted in a tool such as a web browser. Examples include the comment forms made available with most blogs, the Google Gmail web interface or Facebook.

A privacy agent (or software plugin/client or engine) may be provided to intercept a post prior to the post being posted/effectuated. In this way, the content to be posted can be intercepted and then encoded/encrypted before it is uploaded and, then decoded/decrypted, according to a given policy, prior to being rendered. No changes are introduced to the network infrastructure or the hosted web service An end-user equipped with the privacy agent may select to encrypt the contents of a specified form field after supplying the content, but before instructing the hosting tool (such as a web browser) to deliver the content to the web service. Along with the instruction to encrypt, the end-user may identify the policy server and policy that will govern the content to be posted. The end-user may have an account with the policy server where he or she may establish, and later modify, content access policies.

The privacy agent may contact the policy server and log in, given the end-user credentials. The indicated policy may be fetched and along with it, the content encryption key. This communication may be cached for re-use or made automatic with device identity as is common in phones.

The privacy agent may encrypt the content and tag it with a recognizable identifier, the address of the policy server, and the policy identifier. This encrypted package may be prepared in a manner that is likely to be accepted by the server. For example, textual content could be rendered into hexadecimal ASCII code surrounded by a header structure. The encrypted content may then be delivered to the web service.

The web service may deliver the encrypted content to a rendering environment likely with no knowledge that it has been altered or needs further processing. However, the same privacy agent running in the rendering environment may parse the content prior to display and identify segments that are to be decrypted by means of the recognizable identifier.

The policy server and policy identifier may be extracted from the content. The policy server may be contacted to request a decryption key. If terms of the policy are satisfied, the decryption key may be delivered to the privacy agent, which may then decrypt the content and replace the encrypted blog with the cleartext. To the end-user rendering the content, this process can be invisible.

Systems and methods of controlling digital content may be provided. A viewing node may access and process an electronic document (webpage), which has encoded input field content. The encoded input field content may be an encoded version of input received from a publishing node at an input field in the webpage. A decoding policy may be associated with that input field, which includes a reference to a third party policy node.

A policy node, in communication with a client application executing at the viewing node, may be configured to facilitate determining whether the viewing node satisfies the terms of the decoding policy of the input field content in the electronic document. The decoding policy may defer to the third party policy node regarding decoding decisions. The third party policy node, in communication with the policy node, may be configured to respond to a request from the policy node regarding whether the viewing node satisfies terms of a decoding policy. Instructions from the third party policy node may be received by the policy server. The third party node instructions may specify whether the viewing node passed the terms of the policy. The instructions as to whether the viewing node passed the policy terms indicate whether the encoded version of the input field content should be replaced with a decoded version of the input field content.

The policy node may receive a request from the client application at the viewing node to access the decoded version of the input field content. The policy node may respond to the viewing node's request by transmitting a message to the third party policy node including session attributes about the viewing node. In response, the third party node may send instructions to the policy node as to whether the viewing node satisfies the terms of the policy. These instructions from the third party policy node are used to determine whether the encoded version of the input field content should be replaced with decoded content at the viewing node.

If the third policy node instructions indicate that the viewing node has not satisfied the terms of the decoding policy, the policy node may respond by transmitting a message, to the client application executing on the viewing node, indicating that the viewing node is not permitted access to the decoded version of the input field content.

If the third policy node instructions indicate that the viewing node has successfully satisfied the terms of the decoding policy, the policy node may respond by facilitating access to a decoding key to enable the viewing node to process the decoded version of the input field content. A decoding key or a link to the decoding key may be sent to the viewing node so that the encoded version of the input field content may be decoded and replaced with the decoded version of the input field content.

The client application may respond to receipt of the decoding key by accessing a document object model (DOM) tree associated with the webpage to modify and replace instances of the encoded version of the input field content with the decoded version of the input field content. The client application may further respond by directing the browser to draw at least the modified portions of the webpage at the viewing node.

The third party policy node may be controlled by an independent entity having sovereign control over encoding/decoding decisions. A decoding decision, for instance, may cause the encoded input field content to be replaced in the DOM with a decoded version of the input field content.

By introducing a third party policy node in the system, the policy server may defer to an external system (e.g. the third party policy node) in making encoding or decoding decisions with respect to the input field content. The third party node may be used to address privacy laws and/or as privacy concerns of any entity (e.g. governments, organizations, or businesses) who may have an interest in maintaining control of policy terms regarding online published content. In this way, a sovereign third party policy server can be used to control access/define access terms to the encoded online published content.

Systems, methods and computer program products that facilitate an administrative entity's control over digital content posted by a user node may be provided. A request to publish digital content received may be intercepted and received at an input field in an electronic document. The request to publish the input field content may be received by, for example, a privacy agent, client application, plug-in or engine executing on the user node. In response to the publishing request, the privacy agent may determine whether to encode the input field content in the electronic document. For example, the privacy agent may pass session information about the user node to a policy node and, request instructions regarding an encoding policy associated with the input field content. The policy node may send instructions to the privacy agent to replace, in the electronic document, the input field content with an encoded version of the input field content based on an encoding policy defined by the administrative/controlling entity. The controlling entity may be, for example, an enterprise, organization, government entity, guardian, or other node having control over publishing requests made by the user node.

The first user node may be associated with a first user account. Requests associated with the first user account to publish content received at input fields in electronic documents, such as webpages, are decided by policies set by the controlling entity. The controlling entity, for example, may define a policy that indicates whether the input field content is encoded or decoded when published. The controlling entity may be associated with an administrative account, which is configured to have preemptive control over the encoding/decoding decisions associated with input field content input at external sites by the user node.

The encoding policy defined by the control entity's account may be configured to specify which users or group of users have access to a decoding key that facilitates decoding of the encoded version of the input field content. The encoding policy may be configured to specify at least one group, having one or more users, that is permitted to access a decoded version of the encoded input field content. The controlling entity may have control over accounts of a certain domain (e.g. @wave.com). The first user node's account may be associated with, for example, a first domain.

The controlling entity's account may be configured to enable it to eject or suspend the first user's account, or any other of a plurality of user's account in the same or other domains. The encoding policy may be configured so that publishing requests made by the first user's account are encoded during a specified timeframe. For example, if the controlling entity is a company, it may define the encoding policy that specifies that posts made by the first user account are to be posted as encoded content during working hours, while during non-working hours the first user may have control over the encoding/decoding status of its posts. The controlling entity may have the ability to access analytics information associated with content published by the first user node.

The first user's account may be associated with a minor. The controlling entity's account may be associated with a guardian of the minor. The creation of the minor's account may spawn creation of the guardian's account. The guardian's account may be configured to define encoding policies associated with posts made by the minor's account. An encoding policy, for instance, may be configured to specify a least one group of users that is permitted to access a decoded version of the encoded input field content. The policy, for instance, may specify that posts may only be viewed in their unencoded form by a closed group. The existence of the guardian's account and the control it has over the minor's account may be undetectable to other posters.

The existence of the controlling entity's account and the control that it has over the first user's account may be undetectable by other users.

The decision whether to encode the input field content in the electronic document can be facilitated by the privacy agent executing on the user node. The privacy agent may monitor the input field in the electronic document for changes. When a request to publish digital content from the user node is received at an input field in an electronic document, the request may be detected as a result of a change event detected by the privacy agent at the input field. In response to the change event, the privacy agent may send a message to the policy node requesting instructions as to whether the content input at the input field should be published in an encoded form. The privacy agent may transmit, to the policy node, session information concerning the user node and a unique identifier associated with the input field to enable the policy node to determine the associated encoding policy. The policy node may responds to the receipt of the session information and the unique identifier by: generating a decoding key for decoding the encoded version of the input field content; and determining a policy for the input field, the policy defining conditions on which the input field content is accessible to other viewing nodes.

In response to instructions received from the policy node to encode the input field content, the privacy agent may replace, in the electronic document, the input field content with an encoded version of the input field content by: accessing a document object model (DOM) tree associated with the electronic document to modify and replace instances of the input field content with the encoded version of the input field content; and directing the browser to draw the modified electronic document.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 13E and 13F are examples of interfaces, which are used to facilitate management of domain accounts.

DETAILED DESCRIPTION OF THE INVENTION

A description of example embodiments follows.

The teachings of all patents, published applications and references cited herein are incorporated by reference in their entirety.

Example System Architecture

Figure 1:
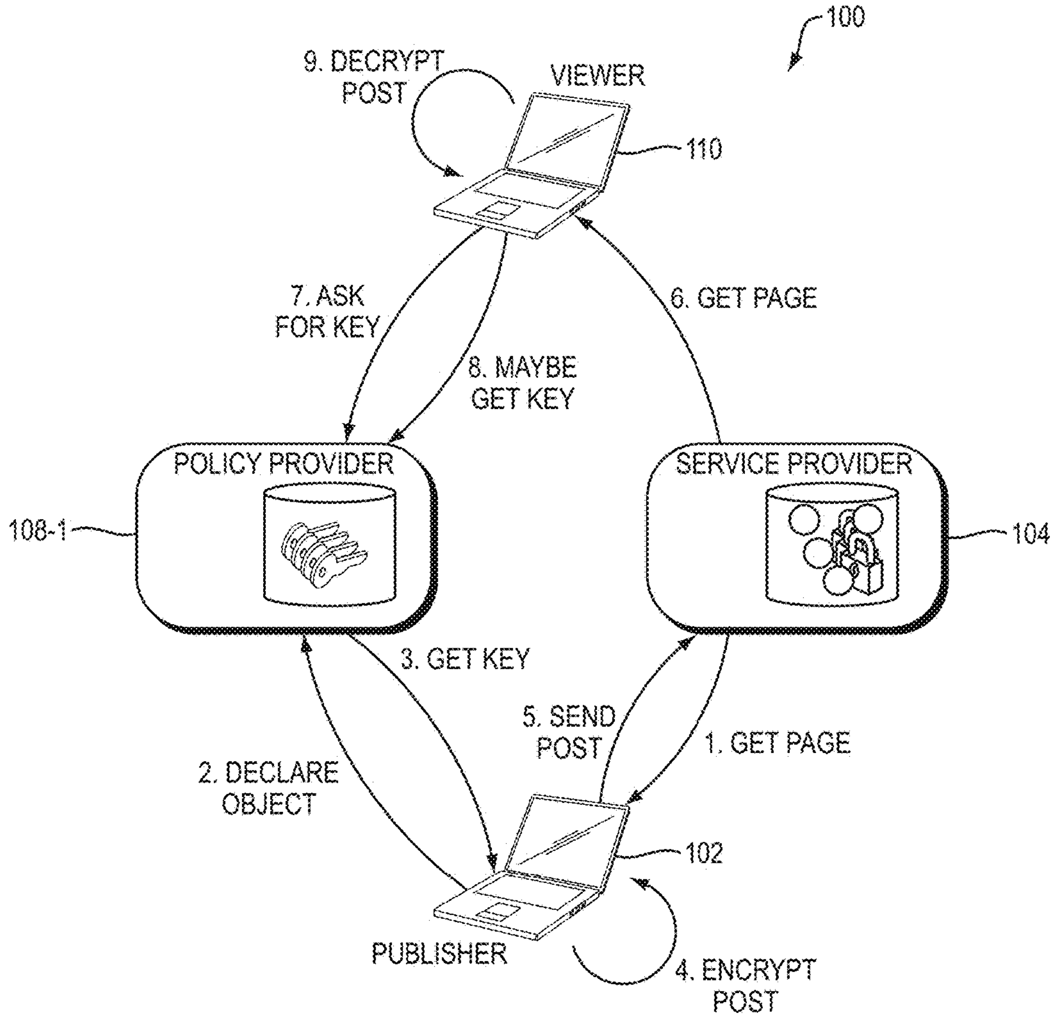
FIG. 1 is a flow diagram showing the interaction between example system components according to an optional embodiment of the invention.

Example features of embodiments disclosed herein may be implemented in a software or hardware environment. One such environment is shown in FIG. 1. In this example, a system 100 is provided for encoding/decoding information. A publisher node 102 can access an electronic document (e.g. webpage, website) using a browser. The publisher node 102 can be, for example, operated by a user who posts information at a webpage. The webpage may be hosted/provided by an online service provider 104. The online service provider 104 can be, for example, any website or service, including any online service provider that enables users to post/share/upload/transmit information. The online service provider may provide any type of web-based content creation and management system that a user can interact with. For example, the online service provider 104 may be a site that allows users to publish information/comments.

The online service provider may provide social networking, news, blogging, podcast, product review, search services, recommendation systems, or other types of services.

Publishing

When the webpage is requested from the service provider 104, the browser typically collects all the images (including the page structure) and stores this data in the browser cache. The browser renders the webpage and, before the browser draws the page such that it would be visible on the display of the publisher node 102, it raises an event indicating that the browser is about to draw the page. The inventive system 100 includes a client application (browser plugin) 300 that provides a listener, which listens for this event to detect when the browser is about to draw the page.

Figure 2:
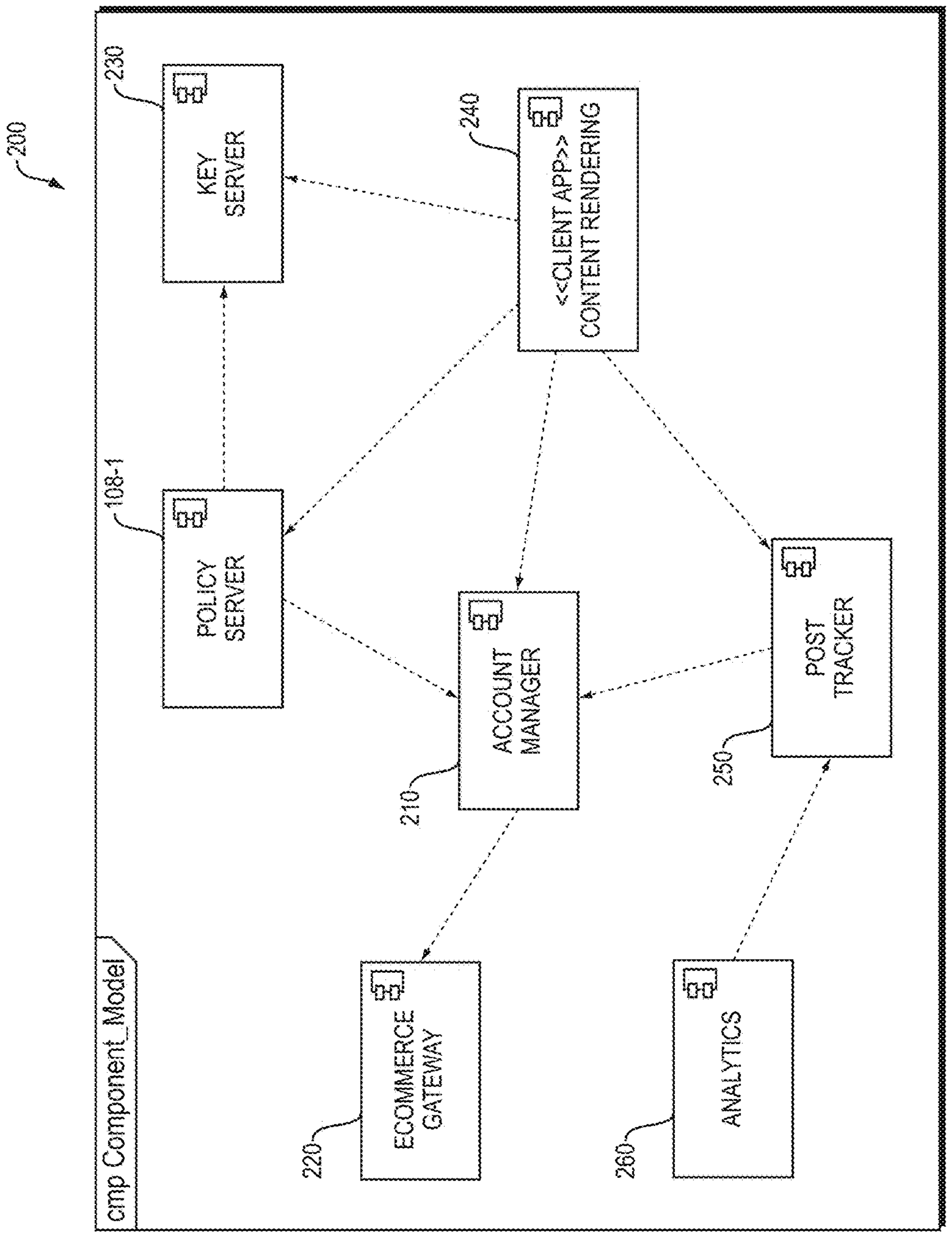
FIG. 2 is a block diagram showing example components according to an optional embodiment of the invention.

Referring to FIGS. 1-3, as the webpage that is requested by the publisher 102 is rendering at the browser, the system 100 parses the webpage content for input fields (e.g. text input entry boxes/forms). For example, processes, which may be implemented in a client application component, such as a browser plugin 300, are executed at the user/publisher's computer, to process the Document Object Mode (DOM) node-tree of the webpage in order to detect one or more input fields in the webpage content. Thus, in response to detecting that the browser is about to draw the page at the publisher node 102, the client 300 intercepts control of the page from the browser. The parser 310 then processes the page to detect input fields. The parser 310 identifies all input fields on the page and loops through each field.

The client 300 assigns a unique post ID and an event handler (e.g. an onChange event/blur event handler) to each input field identified. The onChange event can be fired when the content of an input field changes. The handlers that are assigned to each input field are added to the webpage's DOM. Once the unique post IDs and event handlers have been assigned to the input fields, control is then passed back from the client 300 over to the browser and, the webpage is allowed to be drawn by the browser. Once the browser has resumed control over the webpage, the client 300 monitors the webpage and its associated contents in the background, waiting for the onChange events to be fired. The client 300 monitors the page to detect the situation where the publisher 102 inputs digital content into an input field on the webpage and then the system 100 responds by encoding/encrypting the input. The encoded content is then forwarded to the service provider 104 for posting/loading on the page.

Figure 6:
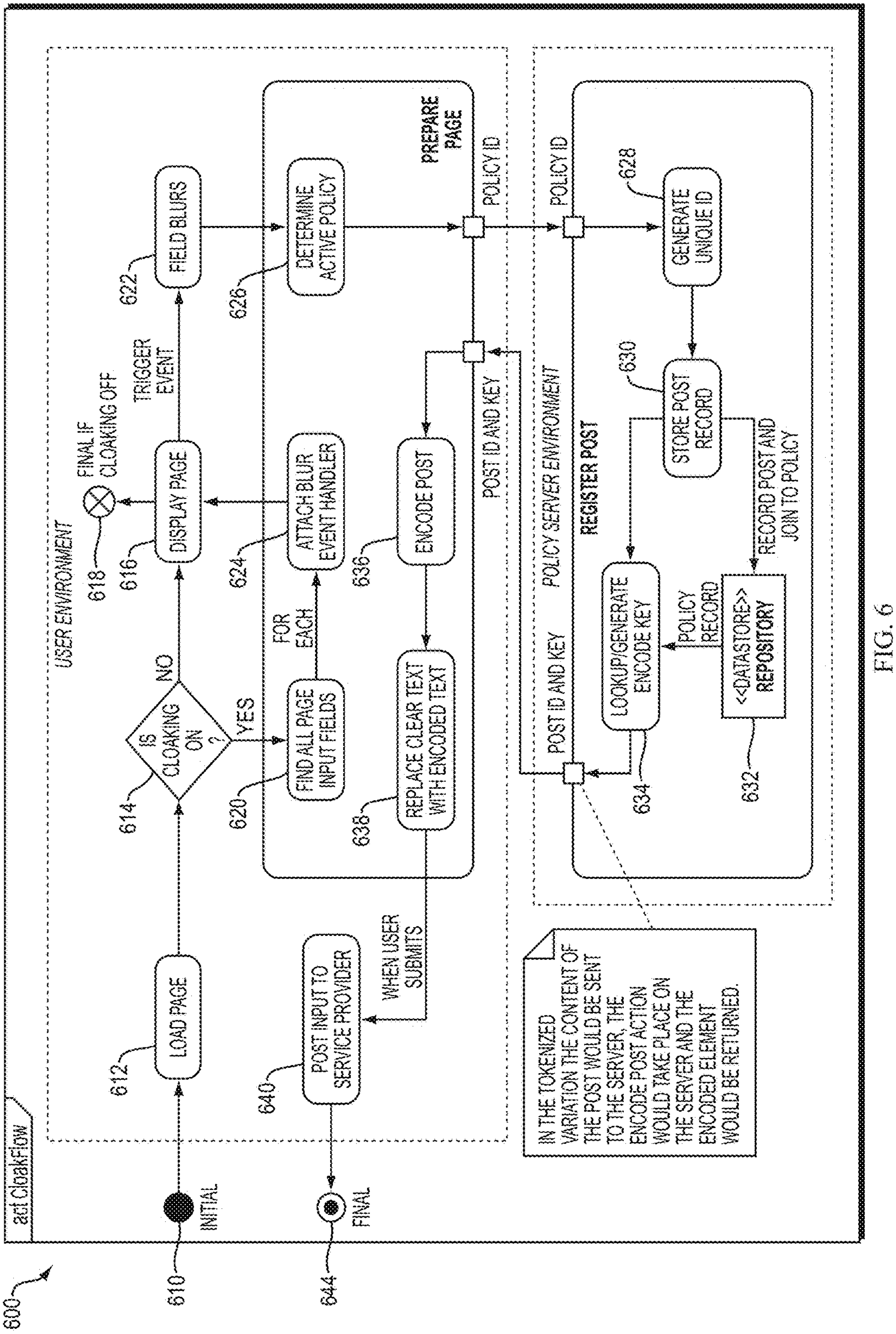
FIG. 6 is a flow diagram showing an example process of encoding cleartext according to an optional embodiment of the invention.

FIG. 6 is a flow diagram showing the process 600 of encoding digital content (e.g. a post/comment/image/video) according to an embodiment. At 612, the page is loaded, and at 614 the system 100 determines whether cloaking (encryption/encoding) is enabled. If encoding is disabled, then at 616 the webpage is displayed without any encryption/encoding. If encoding is, however, enabled then the page is parsed at 620 to detect its input fields in its DOM tree. An event handler is attached to each of the input fields at 622, and the page is displayed at 616. Events (onChange events) are assigned to each input field and are added to the webpage's DOM.

At 622, the onChange event is fired when the content of an input field changes (e.g. the field blurs). Specifically, once the client detects that the publisher's curser exits the field (e.g. loses focus/blurs), the onChange event is fired and detected by the event handler. In response to detecting an onChange event, at 626 components of the system 100 determine an active policy associated with the input field. In one example implementation, the policy server 108-1 receives the unique identifier and the viewing node's 110 credentials/session information, and in response three pieces of information are generated (ID for post 628, decoding key or a URI to the key, and a link to a preexisting policy for decryption). The policy is a collection of terms that need to be satisfied. While the example of FIG. 1 shows the system 100 having one policy server 108-1, other implementations of the system 100 are envisioned that may include one or more external policy and/or external key servers (see e.g. 108-2, 108-3; FIGS. 12C, 12D, 12E).

At 630 and 632, the policy server 108-1 stores the assigned key and the post ID associated with that input field. At 636-640, the digital content (e.g. cleartext) is replaced in the webpage's DOM-tree with the encrypted content and the post ID. The browser is then instructed to draw that portion of the page (at the location of the input field) with the encrypted text and post ID. The user(s), e.g. the publisher 102 (and any viewer(s) 110), will see encrypted text once it is posted. In this way, each input field detected represents a unique postable item and, for each input field detected, a unique identifier/tag is assigned and a key is generated that is associated with that identifier, which can enable the system 100 to identify that field and encrypt digital content that has been input into the page through that input field.

Viewing

Figure 8:
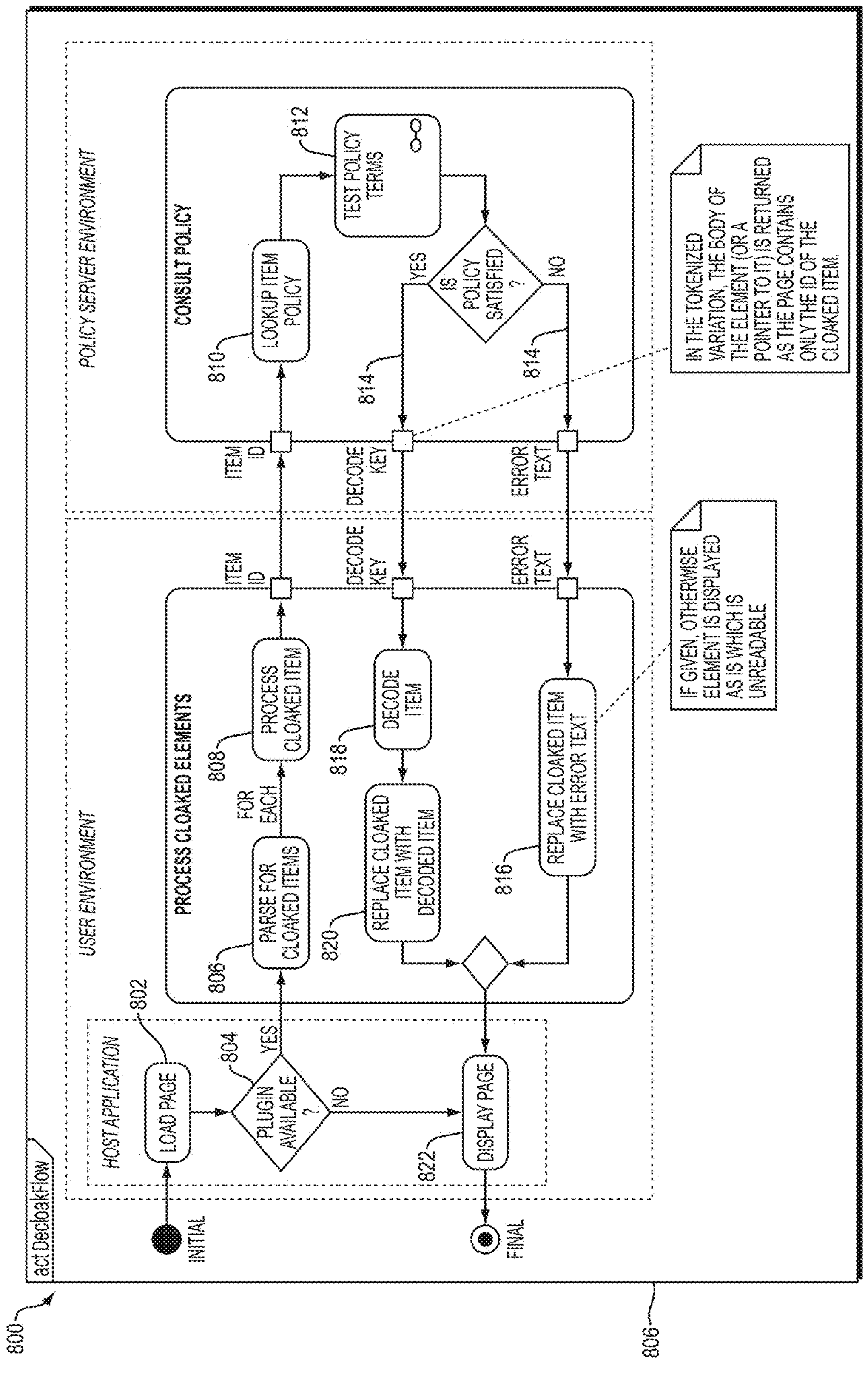
FIG. 8 is a flow diagram showing an example of the process of decoding encoded content according to an optional embodiment of the invention.

With publishing (encrypting text/image/video content), the browser fires the event and the listener detects the event. With viewing the page at, for example, a viewing node 110, this process occurs in reverse in that the listener is fired before the page is drawn/rendered by the browser. Instead of searching for input fields as described in FIG. 6, components of the system 100 (e.g. the parser 312) process the page to detect cloaked items. Referring to FIG. 8, for example, if the client 300 is available at 804, the page is processed at 806 to detect a tag and post ID that are used to identify an encrypted post (e.g. to detect a cloaked or encoded item 808). Once the parser 312 detects the tag/encoded item, it finds a post ID, and looks up the policy associated with the post ID at 810.

Figure 13A:
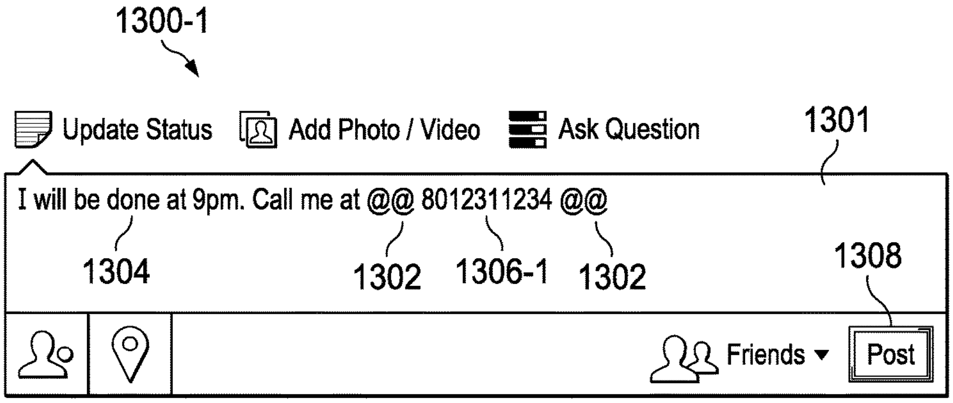
FIG. 13A is an example interface of a text field containing tags, which provide instructions to encode a portion of text input to a post.
Figure 13B:
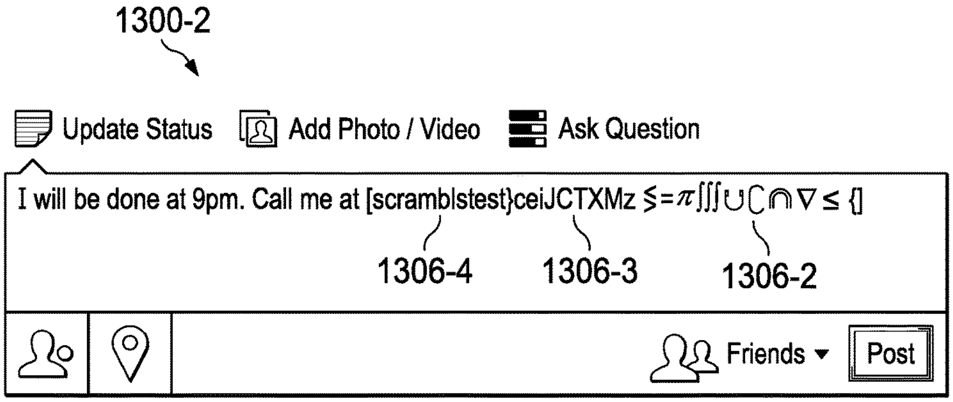
FIG. 13B is an example of the interface shown in FIG. 13A in which a portion of the text in a post is encoded.

In FIG. 13B, for instance, a tag (e.g. header marker) 1306-4 and a post ID 1306-3 are shown in a published post that includes partially encoded text. In this example, textual content (plaintext) 1306-1 has been replaced by the client 300 in the page's DOM with a header structure 1306-4, post ID 1306-3, and hexadecimal ASCII code (encoded content) 1306-2. Specifically, when the client 300 traverses the DOM of a requested webpage, the client 300 searches for a marker (e.g. header tag) 1306-4 [scramblstest} to detect any encoded content. In this way, the header 1306-4 is used to help the client 300 identify that the webpage includes encoded content 1306-2. The post ID 1306-3 is shown as being represented by a unique string of characters, ceiJCTXMZ. The parser can search through every node on the HTML DOM node tree of the page to detect the encoded content tag 1306-4 and the post ID 1306-3.

Preferably, the encoded content tag 1306-4 and the post ID 1306-3 are strings of characters that do not include browser instructions or code (e.g. any markup or scripting code for displaying web pages). The encoded content tag 1306-4 and the post ID 1306-3 can be inserted by the client 300 into the webpage source code as text content during the publishing/posting process. During the rendering/viewing phase, the encoded content tag 1306-4 and the postID 1306-3 are processed and displayed in the webpage as text. Because the encoded content tag 1306-4 and the postID 1306-3 do not include any HTML/scripting instructions, the encoded content tag 1306-4 and the postID 1306-3 are ignored by the browser engine and, processed by the browser as text elements appearing on the webpage.

The post ID 1306-3 provides instructions for the client 300 regarding the protocol that should be used to interpret/handle the encoded digital content that follows the post ID 1306-3. For example, the post ID 1306-3 may be used to look up the policy associated with the encoded content 1306-2, or may be used to inform the client application 300 that there are Unicode characters in the encoded post.

Referring back to FIG. 8, once the parser 312 detects the tag, post ID, and encoded item, the client 300 determines the policy associated with the post ID at 810.

The client 300 sends a message to the policy server 108-1 requesting the policy governing the post. In response, the policy server 108-1 looks up the terms associated with the post. At 812, the system tests the policy's terms. For example, the system looks up the policy associated with the post and processes the terms of the policy to try to come up with a true/false response. For example, the policy server may consider whether the user computer node attempting to view the page with the encrypted content is located the US. The policy server may also consider whether the viewing computer node is associated with a particular email address.

Figure 9:
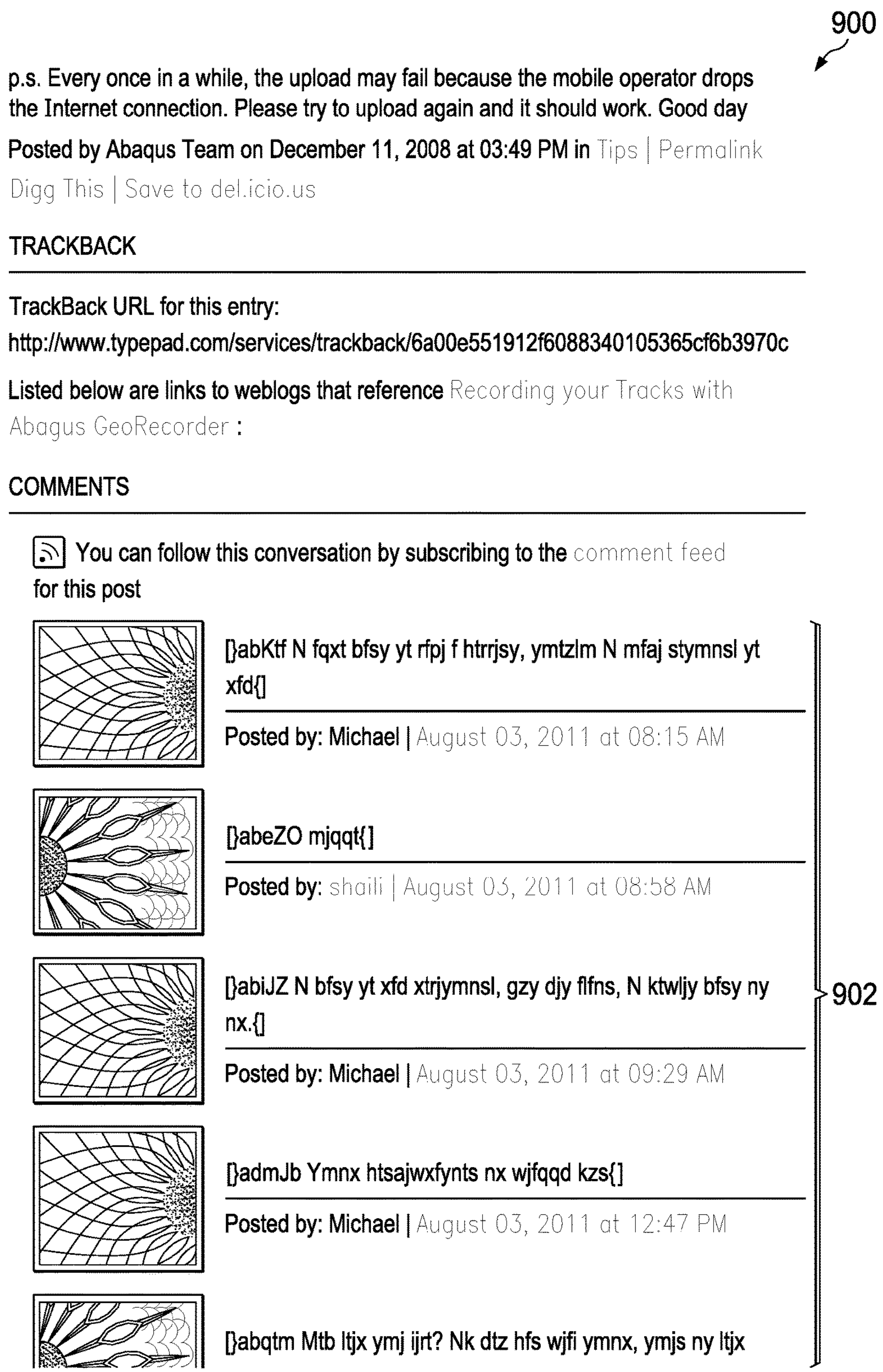
FIG. 9 is an example screenshot of a portion of an electronic document having encrypted posts/comments according to an optional embodiment of the invention.

If the terms of the policy are satisfied at 814, then the decoding key or the universal resource identifier (URI) to the key is sent to the viewing node 110 so that the encoded item may be decoded at 818. At 820, the encoded content (cloaked text or tag) is replaced with the decoded content and the page is displayed by the viewing node 110 at 822. If the terms of the policy are not satisfied, then at 814 the error text is displayed. Specifically, at 816 the cloaked item is replaced with the error text. The error text may be any kind of content. For example, the error text may be content that is displayed as unreadable; it can be advertisements, an image, a URL, or defined text, e.g. "I do not like you." The error text may be customized content specified in the policy terms. FIG. 9 is an example screenshot of a portion of an electronic document 900 having encrypted posts/comments 902, which are shown as unreadable.

It should be noted that in one example of the tokenized embodiment, instead of displaying the error text, the body of the element (or a pointer to it) is returned since the page contains the id of the cloaked item.

Third Party Policy and Key Servers

Figure 12A:
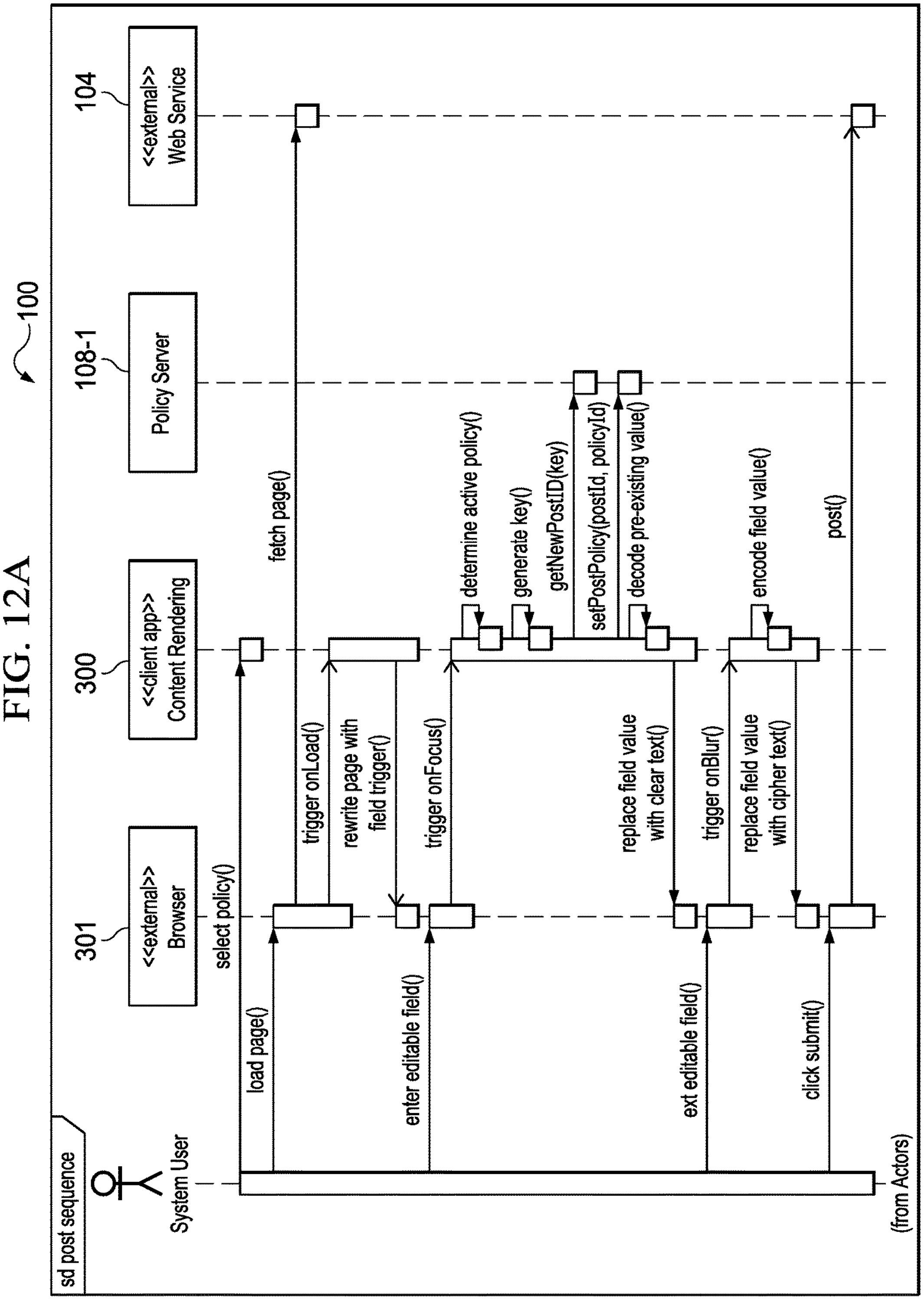
FIG. 12A is an example sequence use case diagram for posting content according to an example implementation.
Figure 12B:
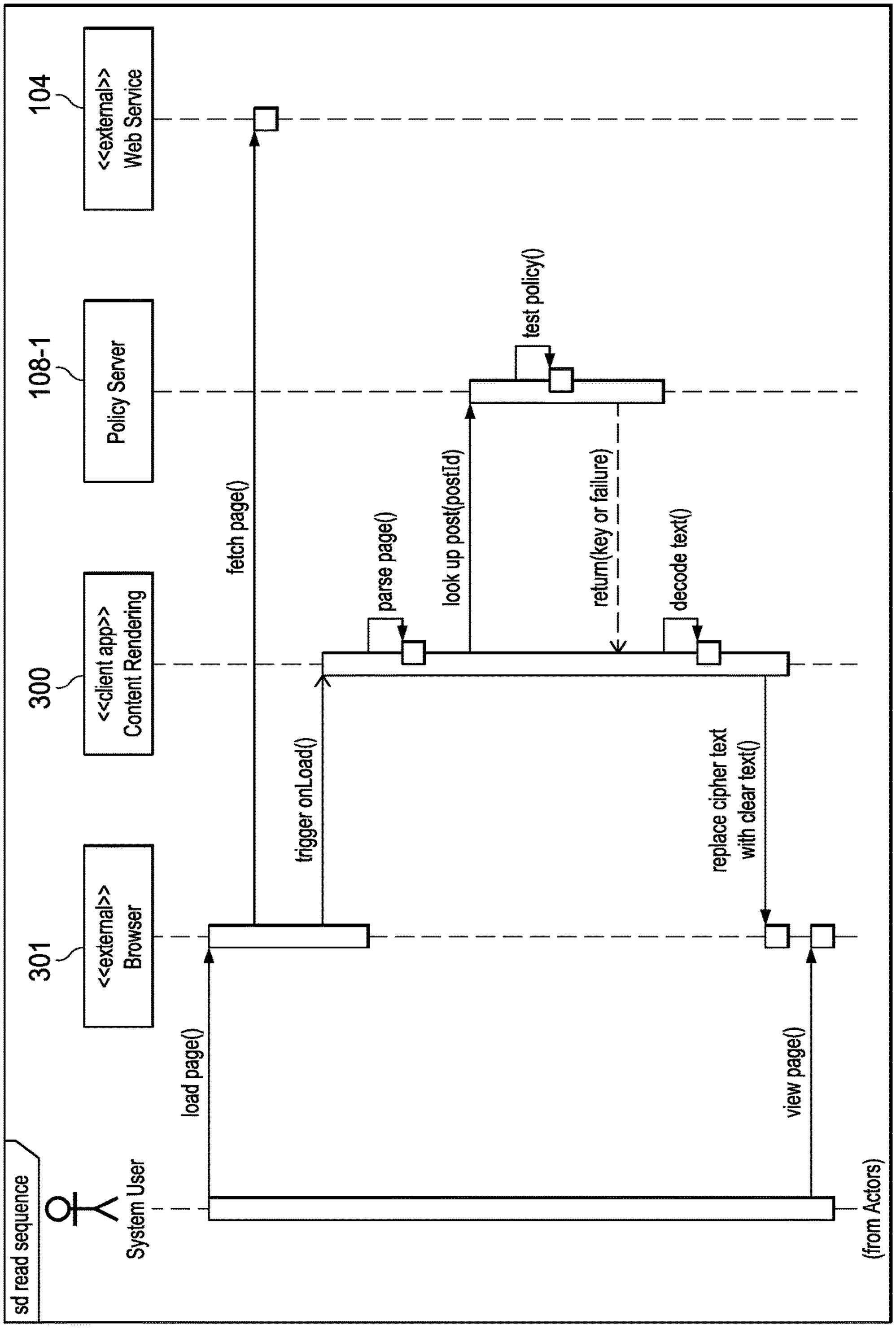
FIG. 12B is an example sequence use case diagram for reading content according to an example implementation.
Figure 12C:
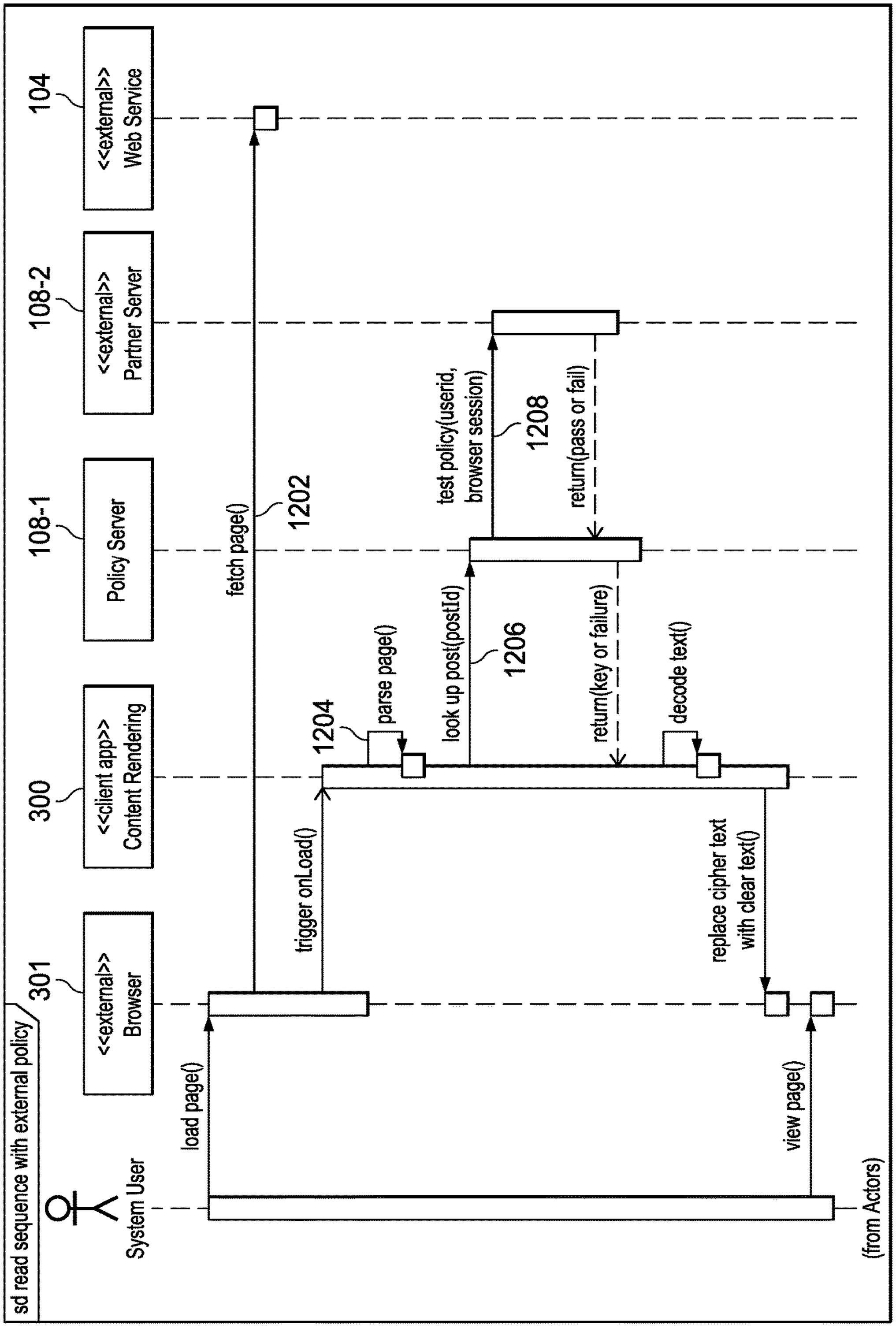
FIG. 12C is an example sequence use case diagram for reading content using an external policy server according to an example implementation.
Figure 12D:
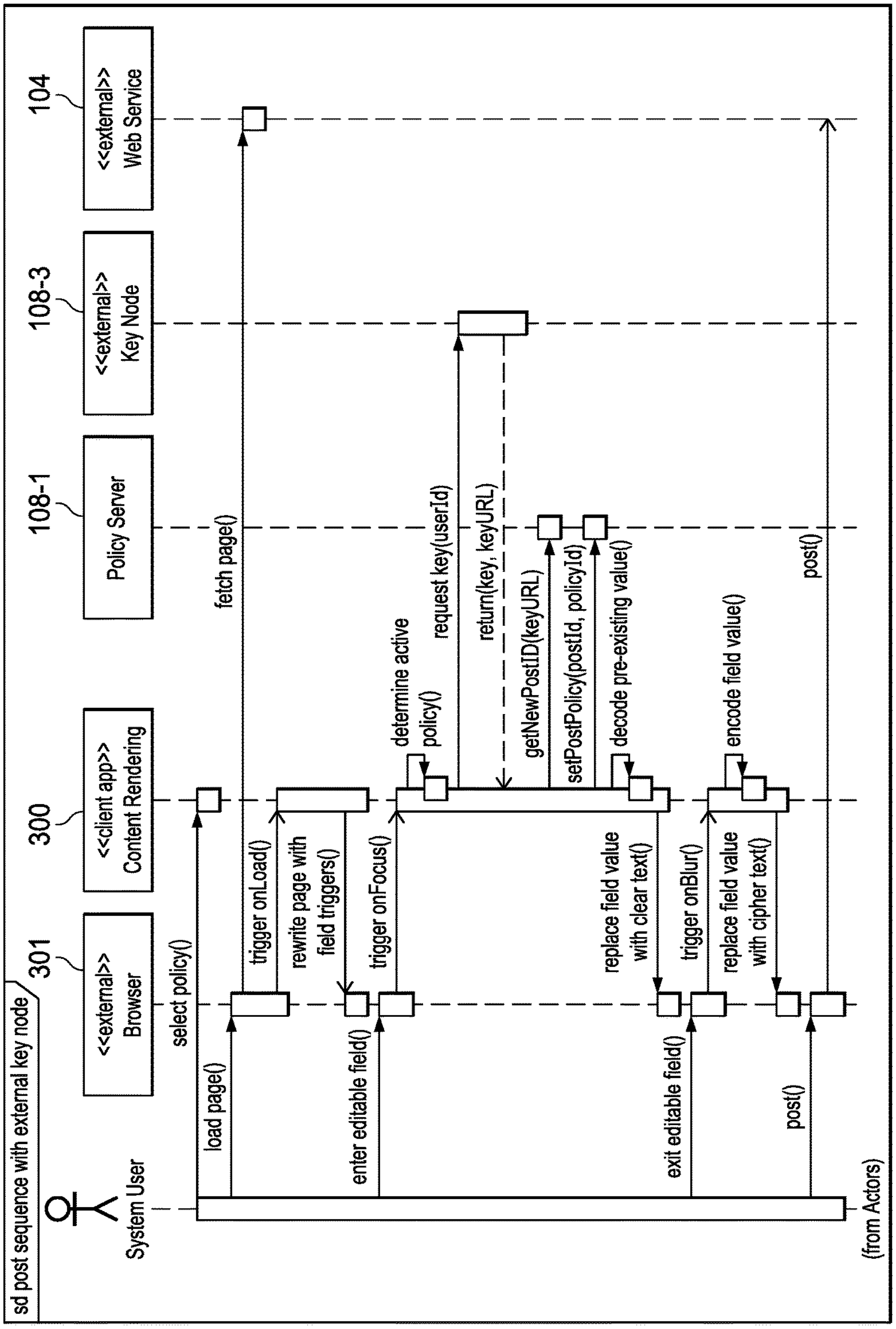
FIG. 12D is an example sequence use case diagram for posting content using an external key server according to an example implementation.
Figure 12E:
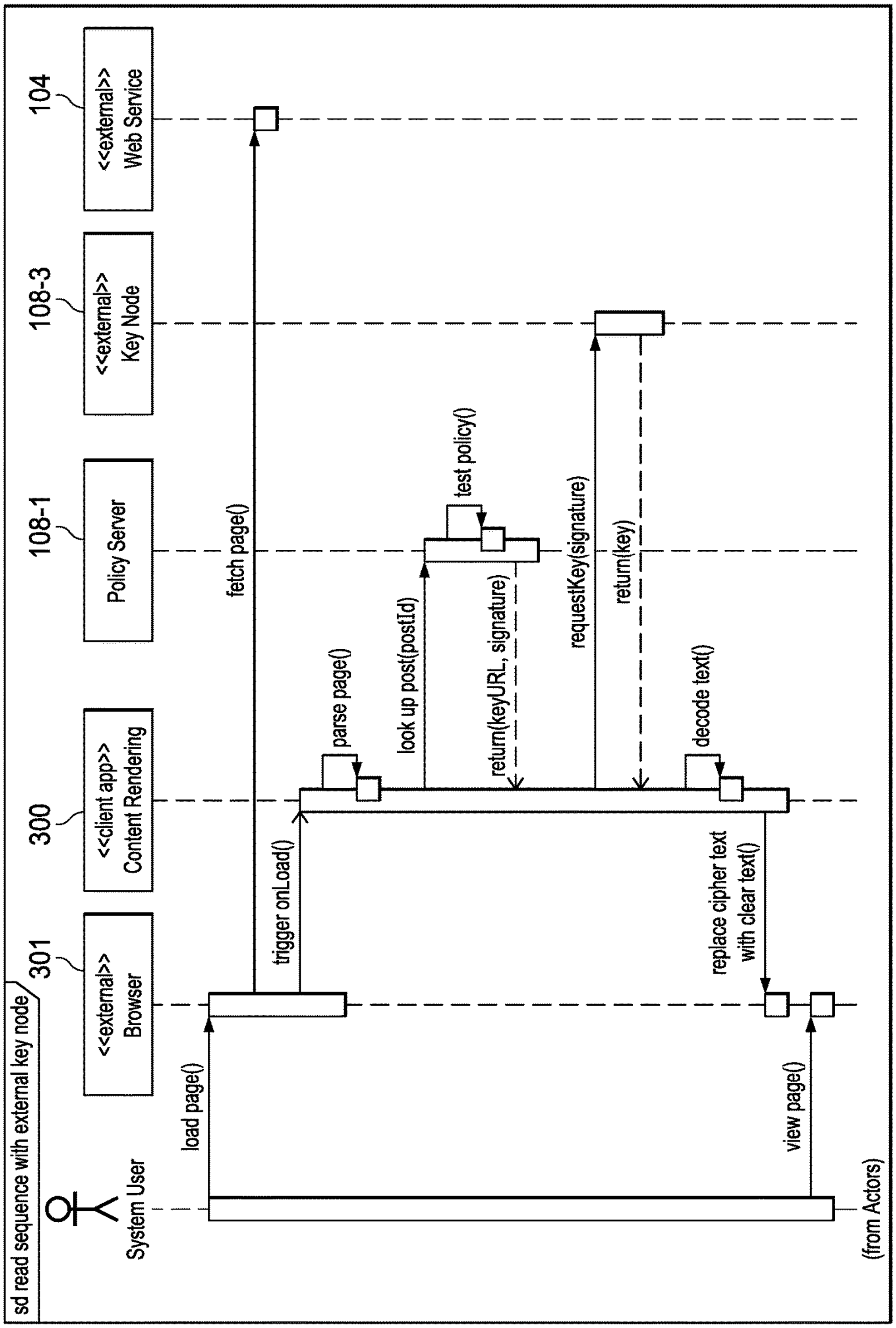
FIG. 12E is an example sequence use case diagram for reading content using an external key server according to an example implementation.

FIGS. 12A and 12B are example sequence use case diagrams for posting/reading content using an internal policy server 108-1, which operates in a manner similar to the example policy server 108-1 implementations of FIGS. 1 and 6. FIGS. 12C, 12D and 12E are examples of other potential policy server/key server implementations. In the example implementations of FIGS. 12C, 12D and 12E, for instance, one or more third party policy or key servers (108-2, 108-3, . . . , **108-*n*) may be implemented in the system 100**. A third party (e.g. foreign) policy or key server, for example, may be included to provide sovereign control of policy terms and/or handle key management.

By introducing third party nodes in the system 100, the policy server 108-1 may defer to an external system (e.g. other third party policy node for further handling/processing). The third party node may customize the policy terms and/or perform key management to address privacy laws and/or as privacy concerns of any entity (e.g. governments, organizations, or businesses) who may have an interest in maintaining control of policy terms and/or keys for the content that is posted, uploaded or transmitted. In this way, a sovereign third party policy server can be used to control access/define access terms to the encoded content, and a sovereign third party key factory can be used to provide independent control of key issuance and/or maintenance.

A user can define a policy that defers to an external policy or key server. In defining this policy, the user can specify the URI of the external server(s) to which they want the policy server 108-1 to redirect. This URI redirection to an external node can become a term of the policy by which encoding/decoding decisions may be controlled.

FIG. 12C is an example sequence use case diagram for reading/viewing content using an external/third party policy server 108-2 according to an optional example implementation of the system 100. A viewing node 110 may login to the system 100 to establish a secure session. The viewing node 110 uses its browser to access a webpage. The browser fetches the webpage 1202 from an external web service provider 104. Before the page is drawn, the client application (e.g. plug-in 300) parses 1204 the page's contents (e.g. its DOM node-tree) for text elements including a marker/tag indicating that the page includes encoded content. The client application may parse 1204 the page's DOM node-tree for images or video content to detect whether there are any encoded content tags in the image/video properties, metadata, and other embedded information.

When an encoded content tag is identified, the client application 300 extracts the post ID and passes it to the policy server 108-1. The policy server 108-1 looks-up the policy associated with the post ID. The policy server 108-1 processes the policy terms to determine if the policy conditions have been met. For example, the policy server 108-1 may process the viewing node's 110 login credentials (login/password), geographical location of the viewing node 110, session variables, cookies, etc., and it may use any of this information to test against the policy terms.

In the example of FIG. 12C, the policy specifies that the encoding/decoding status of the post are to be controlled/decided by an external policy server 108-2. The policy server 108-1 may pass data about the viewing node 110 to the third party policy server 108-2. The information sent to the third party policy server 108-2 may include any information about the viewing node 110 that may be required by the third party policy server 108-2 to compare with the terms of the policy. For example, the user ID, IP address, and browser's session variables may be sent to the third party policy server 108-2. The third party policy server 108-2 may test any of the information it received about the viewing node 110 against its policy terms.

Based on the results of the policy test, the third party policy server 108-2 may transmit a message to the policy server 108-1 regarding its decision as to whether the encoded post can be viewed in its decoded state at the viewing node 110. The third party policy server 108-2, for example, may send a pass or fail message indicating its decision. Depending on the instructions received from the third party policy server 108-2, the policy server 108-1 may transmit to the client 300 the key/cipher/token to enable the client 300 to decode the encoded content. If the client 300 satisfies the policy terms, the client may then receive or generate the decoding key. Once the client has the key, the client 300 decodes the encoded content and traverses the webpage's DOM tree to replace the encoded content with the decoded content, which enables the browser to display the decoded content at the viewer node 110. In another optional implementation, instead of having the client 300 interface with the policy server 108-1 alone, the policy terms may have policy server 108-1 instruct the client 300 to redirect the session so that the client 300 can interface directly with the third party policy server 108-2.

FIG. 12D is an example sequence use case diagram for posting/publishing content using an external key node 108-2 according to an optional example implementation of the system 100. In some respects, the system operates in a manner that is similar to certain publishing/posting implementations described herein, except that an external key server is included as a component of the system 100. When a webpage is processed by the browser, for example, the client 300 intercepts control of the page and tags the page's editable input fields with event handlers and with post IDs that are registered with the policy server 108-1. The client 300 monitors the webpage for any indication of posting activity, such as the firing of an OnChange event associated with one of the tagged input fields.

When the client 300 detects that publishing node 102 has entered one of the editable input fields in the webpage, the client 300 determines an active policy associated with the page, and transmits the post ID associated with the input field and requests a key from an external key node (e.g. keyfactory) 108-3. The key node 108-3 returns a uniform resource identifier (URI) to the policy server 108-1, which is registered at the policy server 108-1. The key URI may include a string of characters that can be used to identify/locate the key at the external key node 108-1. In this way, the key/cipher/token itself does not pass through the policy server 108-1. Rather, the URI to the key is registered at the policy server. With this arrangement of FIG. 12D, the system 100 can help address privacy laws/concerns by providing a system that allows an external entity (e.g. corporation, government agency, etc.) to maintain sovereign control of keys/ciphers/tokens.

The key URI may include a uniform resource name (URN) and/or a uniform resource locator (URL) associated with the key at the external key node 108-3. If the publishing node 102 (now operating as a viewing node 110) satisfies the terms of the policy, the policy server 108-1 sends the key URI and an authorization/access signature (unique one time token), which authorizes the viewing node 110 to access the external key server 108-3 through the key URI. With the external key node 108-2, instead of the client generating its own key or the policy server 108-1 generating the key (which are other possible optional implementations), the third party key node 108-2 generates the key, and a URI reference to the key is stored at the policy server 108-1.

FIG. 12E is an example sequence use case diagram for reading/viewing content using an external key node 108-3 according to an optional example implementation of the system 100. The process in FIG. 12E is similar to some of the other example approaches in the present disclosure, except an external/third party key node 108-3 is used to manage the keys/ciphers for reading/viewing the encoded content in the clear. For example, when a viewing node 110 attempts to view a page having encoded content in a browser, the client 300 identifies an encoded content tag (e.g. 1306-4, FIG. 13B) is identified in the page's DOM. In response to identifying the encoded content tag, the client application 300 extracts the post ID associated with the encoded content and passes it to the policy server 108-1 with the credentials and session information of the viewer node 110. The policy server 108-1 tests the policy associated with the post ID, and if the policy terms are met, then the policy server 108-01 may transmit a signed message to the client 300 including the key URI for the external key server 108-3. The client 300 accesses the key through the URI at the external key server 108-3. The client uses the key to decode the encoded content and traverses the webpage's DOM tree to replace the encoded content with the decoded content.

While FIGS. 12A through 12E show different implementations including various policy servers, external policy servers, and external key servers, it should be understood that other possible combinations/configurations are within the scope of the present disclosure. An external policy server 108-2, for instance, may be implemented so that it includes the external key factory 108-3. Additional external policy servers may be included in the system to provide additional hierarchies/levels of policy/key control, security and/or independence. Further, while certain embodiments include the client 300 interfacing with one or more policy/key servers, it is envisioned that the client 300 may use other resource(s) to handle the policy/key management provided by the policy/key servers. For example, instead of using client/server implementation, a peer-to-peer hybrid like system may be implemented. Rather than having server nodes handle policy and key management, a distributed client application operating in a peer-to-peer like manner may be implemented across a plurality of networked viewing/publishing nodes, and it may perform the policy and key management.

Example Content Rendering Components

Figure 3A:
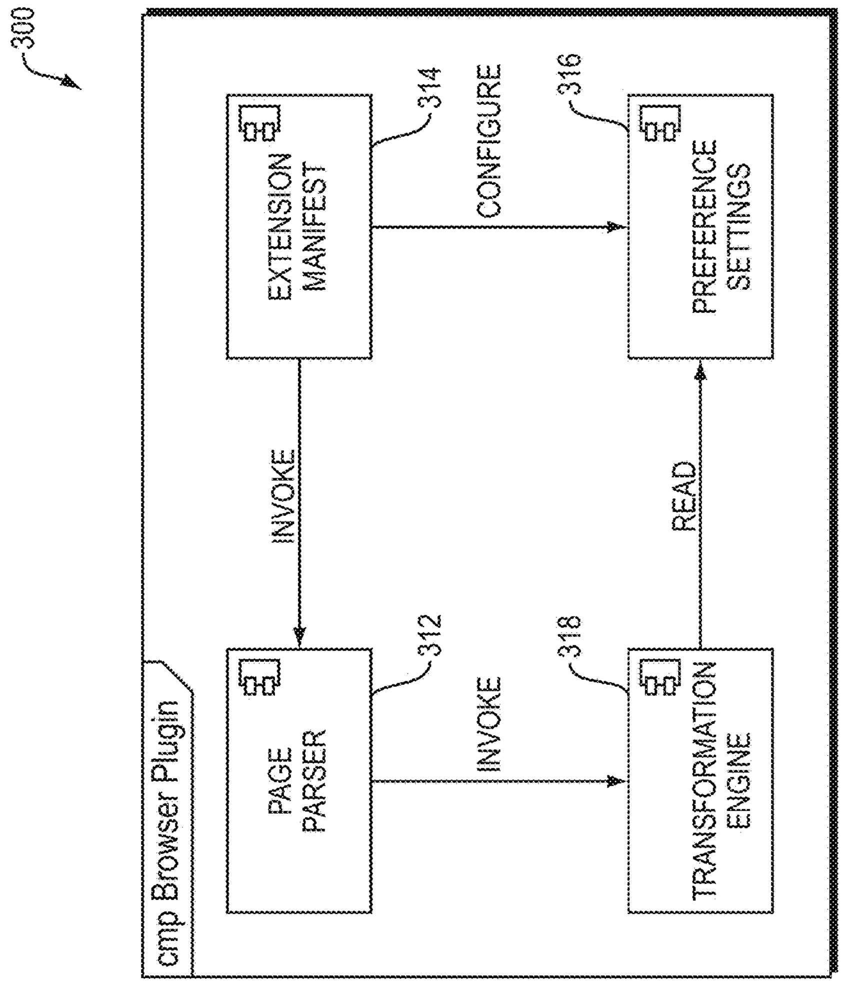
FIG. 3A is a block diagram showing example components of a browser plugin according to an optional embodiment of the invention.

FIG. 3A is a block diagram showing example components of a client application/browser plugin 300 according to an optional embodiment of the invention. The client may facilitate handling the client session using session ids/cookies. The policy server 108-1 can maintain a relationship with the browser session executing at the publishing/viewing node(s) 110, 102 to communicate with the client 300 by sending/receiving information packets (e.g. session ids/cookies).

The client 300 may include a parser 312, an extension manifest component 314, a transformation engine 318, and a preference settings component 316. The parser 312 may be used to process a webpage to detect any unique postable item (e.g. text input fields or other image/video content for encoding—publishing) and to parse the webpage for encrypted/encoded/tagged text (viewing). The unique postable item/content may be any user-entered and user-controlled text/image/video content that is to be cloaked/encrypted/encoded.

The extension manifest 314 may provide a specific structure for the browser that enables events to be declared. For example, an onload event handler can be defined that detects when the electronic document/webpage is loaded (e.g. detects when an onload event is fired); in this way, the client 300 can detect when the webpage is being loaded so that it can process the page for text input fields or other fields that allow for the creation of unique postable items. The transformation engine 318 may facilitate changing cleartext into encrypted/encoded/tagged text (or unencoded content into encoded content).

Figure 10A:
FIG. 10A is an example screenshot of a toolbar for a browser interface in which a user may login to access encoding/decoding features according to an optional embodiment of the invention.
Figure 10B:
FIG. 10B is an example screenshot of a toolbar for a browser interface in which a user has logged in to access encoding/decoding features according to an optional embodiment of the invention.

The client 300 may include a toolbar interface for a browser. FIG. 10A is an example screenshot of a toolbar for a browser interface in which a user may login to access encoding/decoding features according to an optional embodiment of the invention. FIG. 10B is an example screenshot of a toolbar for a browser interface in which a user has logged in to access encoding/decoding features according to an optional embodiment of the invention. As shown in the plugin toolbar interface, the policy may be defined by selecting a policy from the drop down menu for "Policy". The displayed policy will be the one set as the default for the current site. By interacting with the toolbar and selecting the specific policy which is to be applied to the text input (or video/image content being uploaded by the user/publisher). The toolbar can allow the user (publisher) to specify whether or not the user wants to encrypt posts on the current webpage that the user is accessing. Thus, the client 300 can enable proactive transformation of the user's posts by allowing the user to specify whether they want to encrypt and, the client can enable reactive transformation of the user's posts by detecting a post and prompting the user to specify whether it should be encrypted.

The toolbar interface may be provided to facilitate encoding/decoding for the user environment (e.g. publishing/viewing). The publishing/viewing nodes may interact with a policy server environment to facilitate encryption/decryption of content by processing the terms of the policy.

Figure 3B:
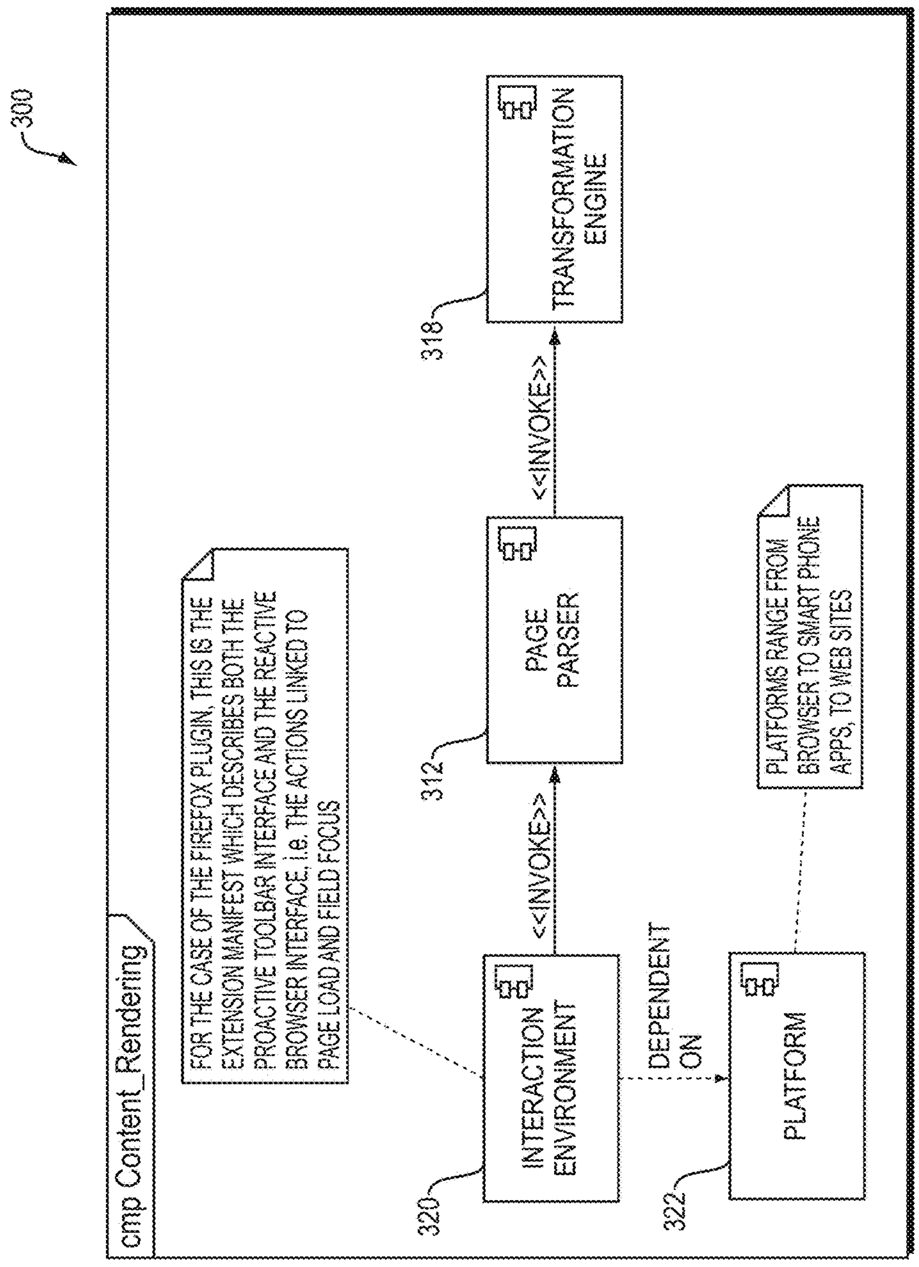
FIG. 3B is a block diagram showing example components of a content rendering environment according to an optional embodiment of the invention.

FIG. 3B is a block diagram showing example components of a content rendering environment according to an optional embodiment of the invention. The interaction environment 320 may be any type of environment capable of handling/facilitating the processing of the encoding/decoding of information (e.g. comments or audio/visual content) posted on a service provider 104 in accordance with embodiments of the present invention. For example, the content rendering environment may include a client (browser plugin) 300 executed by a processor. The platform 322 for facilitating processing and implementation of the content rendering environment may include a browser, smartphone applications, websites, and the like.

FIG. 2 is a block diagram showing example components according to an optional embodiment of the invention. The account manager 210 may provide a collection of information about the various entities, e.g. the publisher 102, viewer 110, etc. Such information may include email addresses, account information, post history, sign in and authentication information, etc. The key factory/server 230 stores encoding/decoding keys. Components of the system 100 (e.g. publisher 102, viewer 110, policy server 108) may interface with the key server to record and fetch keys.

The ecommerce gateway 220 may provide billing and invoicing services for the publisher 102 and viewer 110. The post tracker 250 records or tracks posts made by the publisher 102. The analytics 260 component facilitates analysis/reporting of the records recorded by the post tracker.

Policy Server Node

Figure 4:
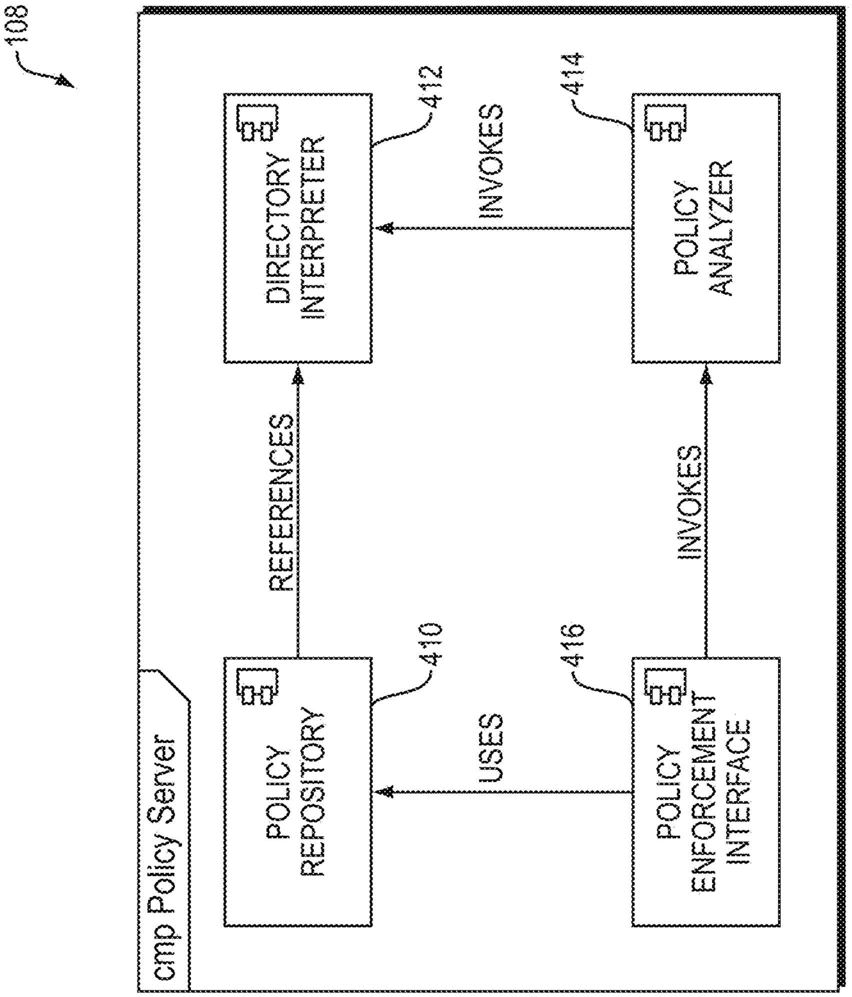
FIG. 4 is a block diagram of example components of a policy server according to an optional embodiment of the invention.

FIG. 4 is a block diagram of example optional components of the policy server 108. Policy repository 410 may provide a database storing policy terms. The terms of the policy may specify any access terms, for example, whether the user attempting to view the content is in the US; whether a specific browser (e.g. Firefox) is used by the user attempting to access the content; whether the user attempting to access is specifically excluded from access. For example, a publisher/user may have a policy specifying restricted access for a particular user (e.g. user B), such that everyone but User B is able to view the publishing node's posts.

The directory interpreter 412 can interface with other external components/directories to configure policy access terms for a post. The policy may be defined to deliver access to specific users identified in some third party system, such as a corporate directory or online contacts list and, the directory interpreter can be used to interface with these third party systems. For example, the publisher may want to restrict viewing access to the publisher's Facebook friends. The directory interpreter 412 may be used to help implement this portion of the policy by inputting (importing) the publisher's Facebook friends. In this way, group access can be created.

The policy enforcement interface 416 may be used to interface with the client 300 at the viewing/publishing node(s). For example, if a publishing node is attempting to encode a post, the client 300 may pass a post, an ID for the post, and a key to the policy enforcement interface 416 for processing at the policy node 108. In one example embodiment, the policy node 108 may be an automated key management server.

The policy node 108 may also confirm that a viewing node attempting to access contents of an encoded post meets the terms for the post ID associated with that item. If the terms are met, then the policy node 108 may return the key. If the terms are not met, then the request for the key may be denied. If the key is returned, then the encoded posts are swapped out for the cleartext at the viewing node. The encrypted text is therefore transformed into cleartext.

The policy may be configured so that viewer access is limited to viewers having a rendering environment that is a trustworthy. For example, if the policy node 107 is able to confirm that the viewing node is trustworthy, the policy node 107 can ensure that the decryption key is likely not to be compromised, stored or redistributed. For example, the viewing node may be considered trustworthy if it has a trusted hardware environment, such as a trusted platform module.

User Accounts

Figure 5:
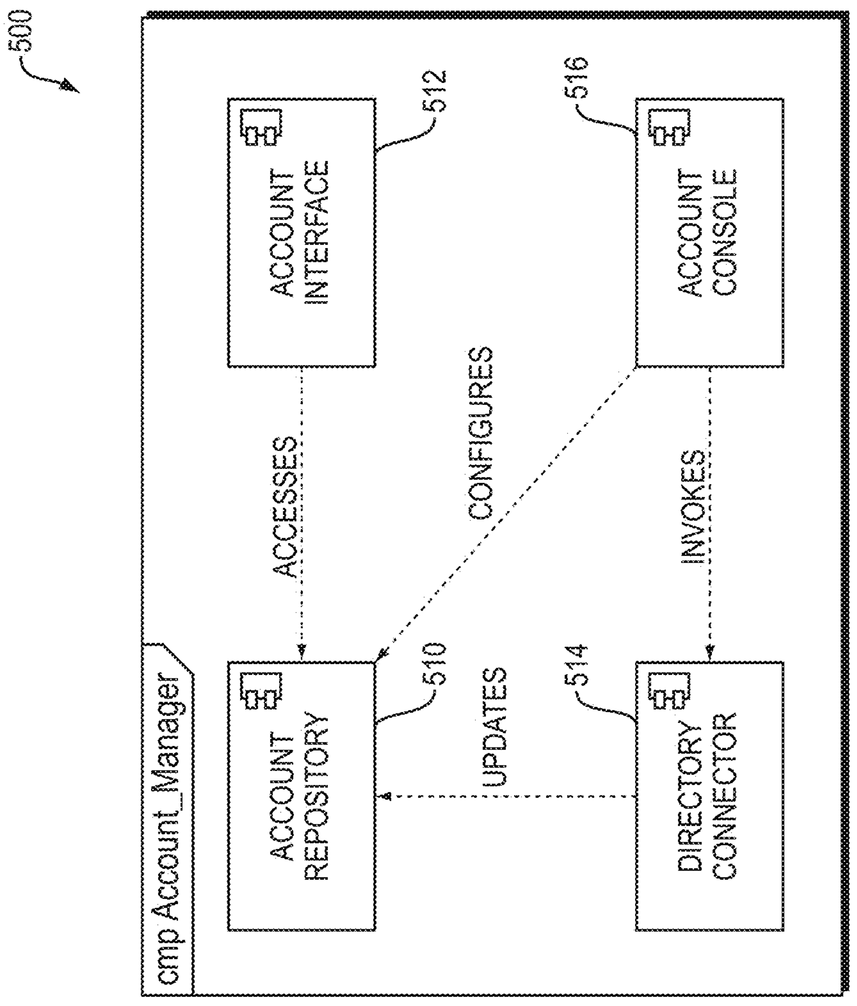
FIG. 5 is a block diagram of example components of an account manager according to an optional embodiment of the invention.

FIG. 5 is a block diagram of example components of an account manager 210, 500 according to an optional embodiment of the invention. New user/create account signup may be provided with an account management component 500, which interfaces 512 with the client 300. By setting up an account, a user can login, for example, using the login portion of the browser toolbar interface. Login credentials may be stored in the repository 510 and used to help manage identity of system users. Once a user of a publisher/reader node(s) 102, 110 has logged in using the client 300, a persistent session can be established that enables the client 300 (and policy server 108-1) to continuously verify their respective identities. The policy server 108-1 can use attributes of the session context (e.g. client's credentials, IP address, and location information) to manage the user's respective identify/identities. Even if a user has multiple identities (e.g. work email, personal email, Twitter handler, etc.), the system will be able to recognize them.

Controlling Entity's Account

An end user's account may be configured so that it is associated with a controlling entity's user's account (e.g. cosigned/guardian/parental account). The controlling entity's account may be arranged so that it has preemptive rights to override posting decisions or policy configuration decisions made by the end user. These preemptive rights associated with the cosigned account may be hidden from other users and from the end user. For example, an end user's account may be configured so that additional user(s), such as a parent or co-signatory have override control over the encoding/decoding status of content. The parent/co-signatory may have the ability to override the policy associated with a post made by, for example, an end user who is a minor. The parent/co-signatory may have control over whether the minor user can published certain content and, whether such content is encoded/decoded for a group of users. This feature may uniquely allow, for example, a co-signatory/parent to have control over whether his/her child's social networking posts are encoded or decoded.

The system may have a setting enabling the cosignatory/parent to specify that all posts made by the child online are to be encoded. The system may enable the cosignatory/parent to control which users are granted key access to view the encoded posts as cleartext. For example, the cosignatory/parent may be able to preemptively specify that all posts made by the minor user may only be decoded by a closed group. This preemptive cosignatory/parent account may facilitate compliance with Child Online Protection Act (COPA) requirements.

Further, the parent/cosignatory may be able to configure the minor user's account so that it is not apparent to the group (or any other users) that the policy decisions associated with the minor's account are controlled by a parent/cosignatory. This hidden status associated with the parent/cosignatory account may be a feature that can be enabled so that it appears as though the minor user is operating independently without any preemptive control by another user. In this way, the parent/cosignatory may have rights that supersede the rights of the minor user, while the parent/cosignatory operates in a manner that appears invisible to other users.

Domain Administration

Accounts associated with the system may be configured so that a second party, such as an enterprise or other controlling entity, has control over the publishing status of posts made by users from within its domain. A domain of accounts may be determined based on the identity of the account. For example, if the domain is "wave.com", then users with an @wave.com address fall into the domain automatically.

While being in a domain does not necessarily equate to being in a group, by default, a new enterprise account may have an associated group defined which matches that of the domain. If, for instance, an enterprise account is "EndUser@wave.com", the account settings may be configured such that all users from the same domain, i.e. "from @wave.com" are granted access to decoding keys to view EndUser@wave.com's posts in the clear.

Figure 13C:
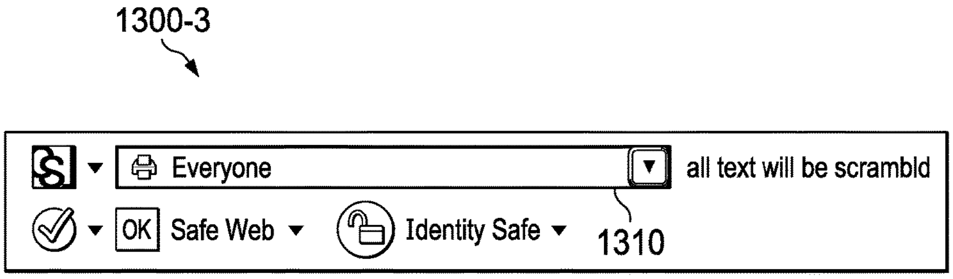
FIGS. 13C and 13D are examples of interfaces, which are used to facilitate to facilitate control over access to an encoded post.
Figure 13D:
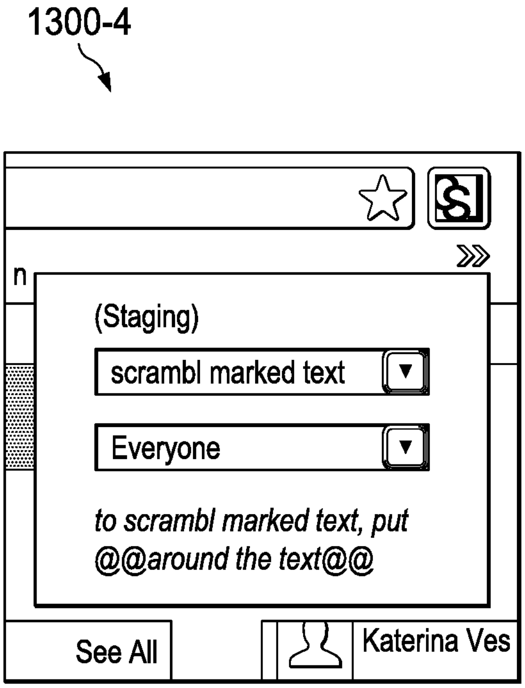
Figure 13F:
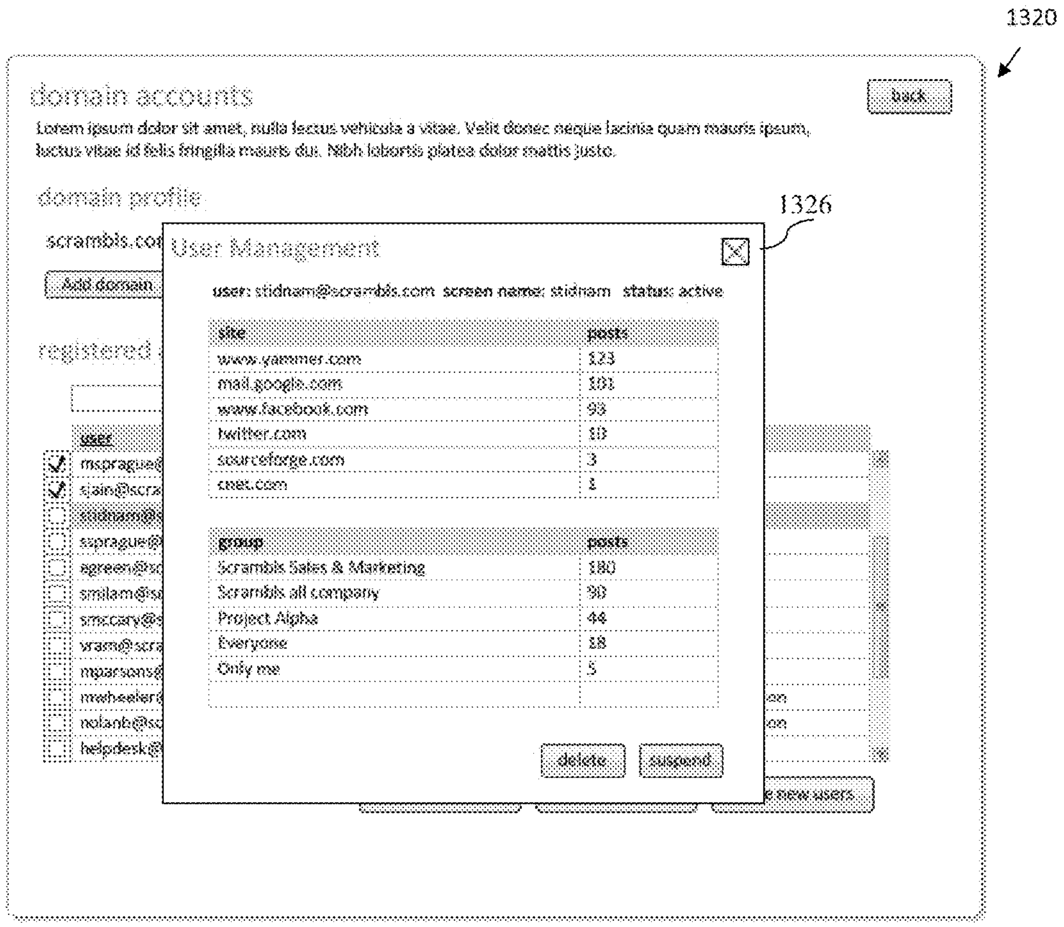

FIGS. 13E and 13F are examples of interface controls 1320, 1326 configured to facilitate managing domain accounts. As new, or existing users can claim accounts with their domain address, they will appear in the domain accounts list 1324. The administrator, which could be an employer, enterprise, guardian, or any other controlling entity, may then view the activity of that account 1324, as shown in FIG. 13F. The administrator can use these interfaces 1320, 1326 to suspend or delete a user. The administrator can use the interface 1320 to add an additional domain 1322 to be managed/monitored.

While the embodiment of FIGS. 13E and 13F generally relate to managing a domain of email identities, similar features for individual identities (such as family members/cosigned/guardian accounts) may be supported as well. In the family/guardian model, instead of claiming/associating a domain, the administrator claims oversight over another account. Preferably, the other account approves of this oversight. However, the oversight control may be a condition/feature/policy associated with an account setup if the user setting up the account is a minor.

In one embodiment, the plug-in 300 can be configured so that it is always on. In this way, for example, any publishing activity by a user node can be subject to the policies defined by controlling entity, e.g. enterprise, employer, or guardian. The enterprise/employer/guardian can configure a user's account with a failsafe to ensure that the plug-in is always on when the user is logged-in to the system 100 or when a certain computer system is used by the user.

In an example enterprise/employer implementation, the controlling entity may configure the policy so that the plug-in 300 executes and cannot be turned off during a specific timeframe. For example, the controlling entity may specify that all posts made by a user to external sites are encoded during working hours (e.g. from 9 AM-5 PM). While during non-working hours, the encoding status of posts may be defined by the user. This time sensitivity configuration may be useful if the user has a company laptop, for example, that they are permitted to take home after working hours.

In the conventional online publishing environment, a user at a publishing node 102 who posts a comment to a third party site 104 is typically unable to obtain analytics information concerning the post. For example, the publishing user may be unable to find out information concerning other users who have viewed the post, where the other users are located, where the click path taken by the other users after viewing the post. Such analytics information is typically unavailable to the posting user unless, for example, the third party site provides the information.

With the present disclosure, a system 100 may be provided that may enable a user who publishes a post on a third party site 104 to control who has access a decoded version of the post and determine analytics data associated with the those viewers who accessed the decoded version of the post. The publishing user (e.g. author of a post/comment on a third party site) may be provided with analytics information concerning the viewers of its post, without the third party site's knowledge or control. An aggregate view of traffic accessing/viewing the post may be provided to the publisher. With the present system 100, for example, the publisher may be provided with analytics information concerning the number of viewers that rolled over the post, the number of viewers that successfully view the post, and the number of viewers that were rejected and thus, unable to view the post. In this way, if the publisher/user encodes his or her post/comment when it is published at a third party site, the user is able to monitor traffic accessing the post/comment, including information about who are the visitors, IP geolocation of the visitors, and the number of views. Access to this information helps gauge traffic and popularity trends which is useful information previously unavailable to most users who post on third party sites 104.

The publishing user may configure the policy associated with an encoded post to specify that analytics data should be gathered. The policy, for instance, may be configured so that if the encoded post is decoded by a viewing node 110, an alert may be generated to notify the publishing user about the analytics details concerning the viewing node who viewed the decoded post.

Encoding Portions of Content

Portions of posted content may be encoded. For example, portions of a body of text in posts/messages may be encoded, while other portions of are intentionally left in the clear. One such example is shown in FIGS. 13A and 13B. FIG. 13A is an example interface 1300-1 of a text field 1301 containing tags 1302, which provide instructions to the client 300 to encode a specific portion 1306-1 of text input in a post. The tags @@ may be inserted around the content to be encoded. The portion of the string 1304 in the input field 1301 outside of the @@ tag 1302 remains in the clear, while the portion 1306-1 of the string that is surrounded by the @@ tags is configured to be encoded. FIG. 13B is an example of the interface 1300-2 shown in FIG. 13A in which the portion 1306-1 of the string surrounded by @@ tags 1302 has been encoded 1306-2. By encoding only portions of posts, the unencoded segment of the post may provide a teaser to the encoded content in the post/message.

Further, a policy associated with the post may be configured to allow tiered access for user(s)/group(s) to the decoding keys for the post. In particular, certain user(s)/group(s) may be granted access to a decoding key to reveal subsets of the encoded content, while other user(s)/group(s) may be granted access to a decoding key that decodes all of the encoded content. FIGS. 13C and 13D are examples of interface control features for defining group access to an encoded post. At the input selection 1310 in the toolbar 1300-3 for controlling group access, an end user may specify which users should be granted access to the decoded text. Using the toolbar of 1300-4, the user can instruct the client 300 to encode only portions of the text marked using the @@ tags, and the user can further instruct the client 300 as to which users (or groups of users) should be permitted access to the cleartext.

Publishing Monetization

Users that post at a third party site 104 typically do not have a mechanism enabling them to charge users to view the post. With aspects of the present disclosure, a monetization scheme may be provided to such a user by allowing the user to define a policy associated with the post that requires prospective viewers to pay a fee for decoding key access. Users that desire to view decoded posts/comments published at a third party site, may be required to pay a fee for the decoding key. For example, a user having a Facebook or Twitter page, may define a policy that requires viewers to pay for key access so that the viewers may view decode a post. This monetization scheme may be further enhanced by the technology described herein, which encodes portions of a post. In this way, if a publishing user encodes a portion of their post and uses the unencoded portion of the post as a teaser to entice viewers to request/pay for access to view the entire post in the clear. A viewer interested in viewing the entire post may, for example, click on the encoded portion to create an account through the account manager 500 and/or login to the system 100, and then execute a payment transaction in exchange for a token (key/cipher) to view the encoded portion of the post. The transaction may be processed by components of the system 100 using a communications network (credit card network, debit card network, or private label network).

Transformation and Tokenization

There are a plurality of potential approaches to encoding the data. One example approach is transformation, which involves encoding the content prior to its posting to a third-party web service (service provider 104). In one embodiment, the client 300 may be designed with an open architecture platform so that third parties have the ability to insert their own transformation engine 318. Another potential approach is tokenization, which involves posting a pointer to the content and keep the content on the, for example, policy nodes/servers (or somewhere else).

With transformation, one uses a scheme which can be resilient as the external web service 104 will handle the data like normal text and try to format it. One benefit to transformation is that policy server (or other system) may be configured so that it is not responsible for storing the post and, therefore, it is not responsible for all the data storage.

With tokenization, an external site receives an id, and that id provides a pointer to the encoded (tokenized) content, which can be stored at another node (e.g. a storage node, the policy server node, or on another system, such as a peer-to-peer network). One example benefit with tokenization is that the content may be individually managed; for example, an unwanted post may be easily removed by deleting the pointer (token). In one example preferred implementation, one would apply encryption to the content before it is uploaded to another node to provide additional safeguards to protect the data.

In some implementations, tokenization may be more resistant to cryptanalysis, such as to attacks. For example, the crypto may be more difficult to guess since one would not need to maintain size and word structure. Further, the integrity of the content would likely be complete (e.g. provided that the external server returns back the entire ID, since half an ID string may be inefficient.)

Further, with tokenization, implementation may be provided without modifying existing browser systems. Therefore, browsers can encode/decode using the tokenization approach with or without a plug-in interface.

A variation on tokenization may involve embedding an ID in English. A paragraph long sequence of real words, for example, may provide enough variation to represent a unique ID. With this configuration, it is possible that the token may be undetectable by external servers.

Removing Content

Figure 7:
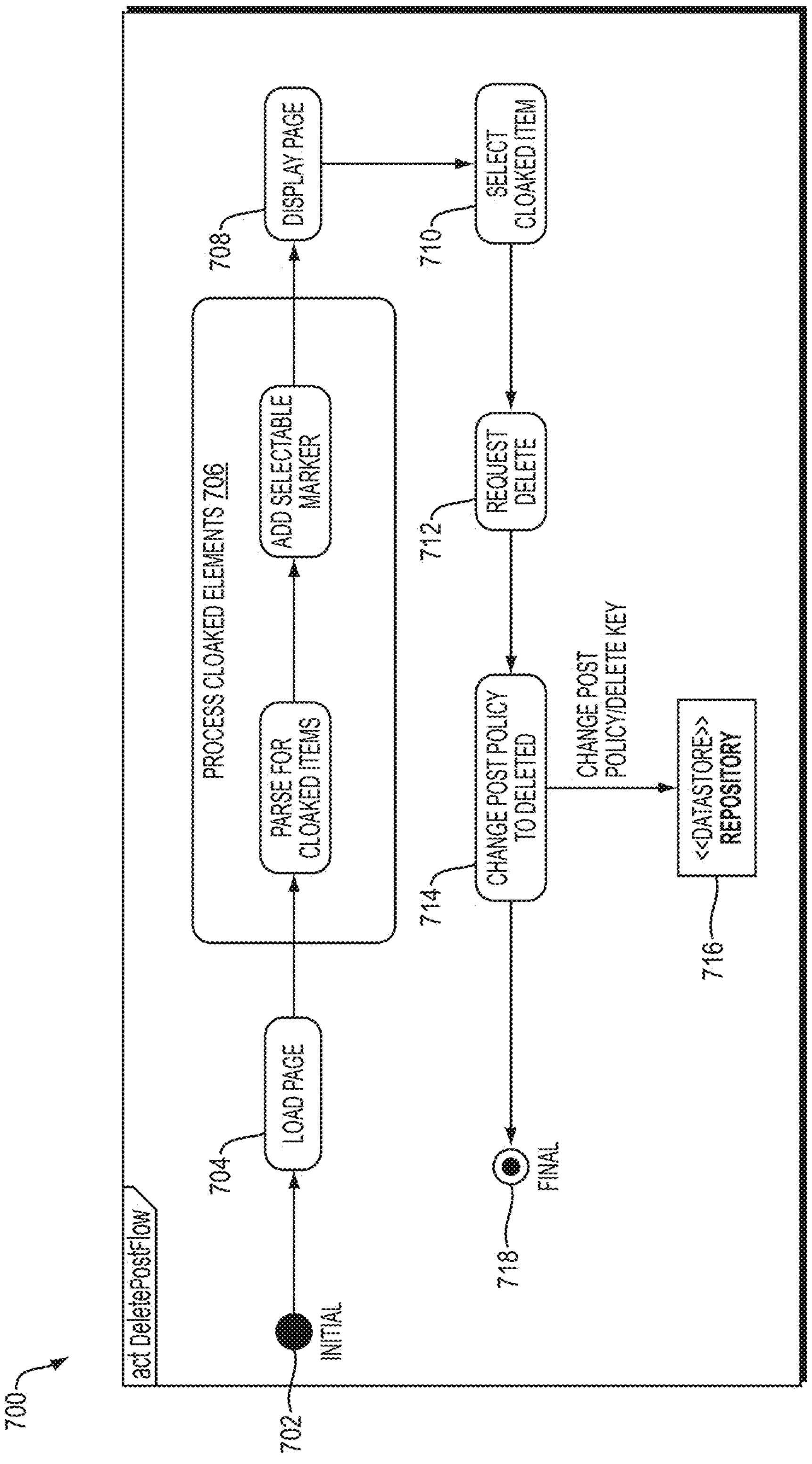
FIG. 7 is a flow diagram showing an example process of deleting a post according to an optional embodiment of the invention.

Users may be use the system 100 to ensure that they are able to uncloak content after the encoded version of the content has been posted to a web service 104. FIG. 7 is a flow diagram showing an example process of deleting a post according to an optional embodiment of the invention. At 704, the page is loaded and at 706 it is process for cloaked items and displayed 708. The user selects a cloaked item at 710, and requests to delete this item at 712. The policy is modified to reflect that that post is deleted at 714, and this information is stored in the repository 716.

Figure 11:
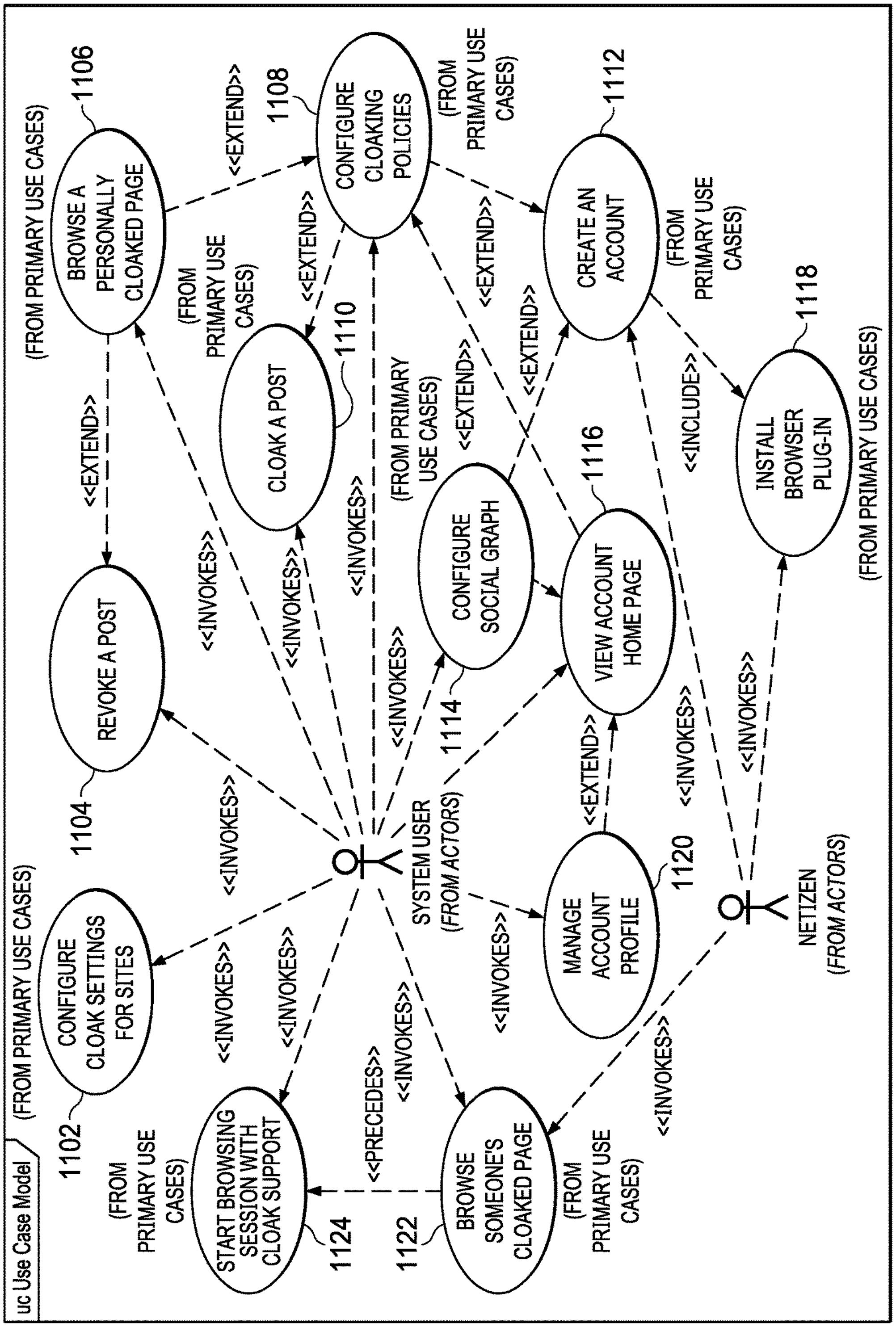
FIG. 11 is an example use case diagram of the users (actors) according to an optional embodiment of the invention.

FIG. 11 is an example use case diagram of the example users (actors) of the system 100 and the different functions/uses of the system 100 that they can perform. In this example, a user is able to do several functions in the system 100: browse with cloak support 1124; configure cloak settings for external sites 1102; cloak a post 1110; revoke a post 1104; browse with cloak support (plugin support) 1124; browse a page that has been cloaked been cloaked by the user 1106; configure cloaking policies 1108; create an account 112; configure social graph 114 (configure groups and relationships between viewers that are granted/denied access, etc.); manage their profile 1120; browse someone else's cloaked page 1122; install the client application/browser plugin 1118.

Mobile Agent Implementations

A mobile agent implementation of the invention may be provided. A client server environment on which to enable mobile security services may be implemented including features of the invention. It uses, for example, the XMPP protocol to tether a background cloaking agent/client on the device to a server (e.g. 108-1, 108-2, 108-3). The server can then issue commands to the phone on request.

Self-Encrypting Hard Drives

Embodiments of the security/cloaking schemes of the inventions may be implemented using self-encrypting drives. Such security schemes may be used to help protect against data loss due to a lost or stolen PC. The Trusted Drive Manager software activates the security that distinguishes a self-encrypting drive from a standard hard drive. Examples of such technology are described in, for example, U.S. Pat. Nos. 7,036,020 and 7,426,747, the entire contents of which are incorporated herein by reference.

Processing Environment

Figure 14:
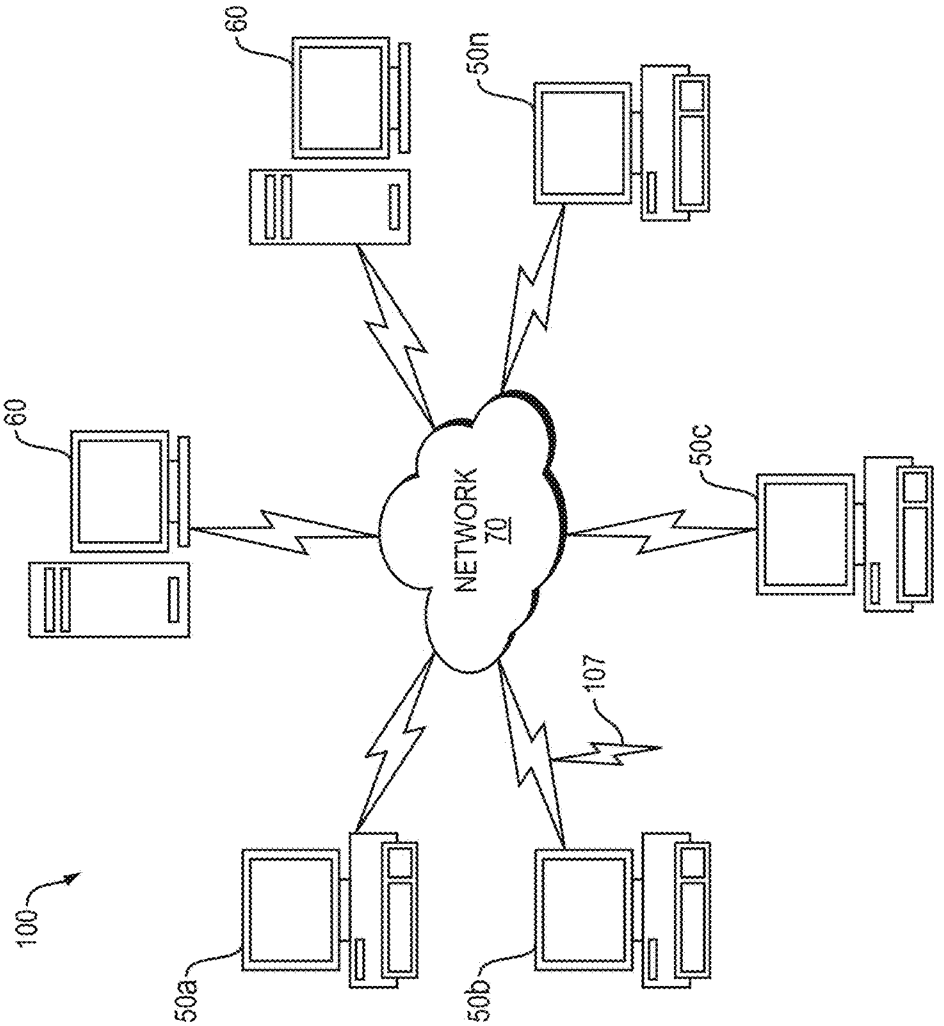
FIG. 14 illustrates an example computer network or similar digital processing environment in which the present inventions may be implemented.

FIG. 14 illustrates an example computer network or similar digital processing environment in which the present inventions may be implemented. The viewer nodes 110 or publisher nodes 102 may be client computer(s)/devices 50 *a, b . . . n* (50 generally) and the policy provider 108 and service provider 104 may be server computer(s) 60 that provide processing, storage, and input/output devices executing application programs and the like. The viewer 110 and publisher 102's client computer(s)/devices 50 can also be linked through communications network 70 to other computing devices, including other client devices/processes 50 and server computer(s) 60. A communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 15:
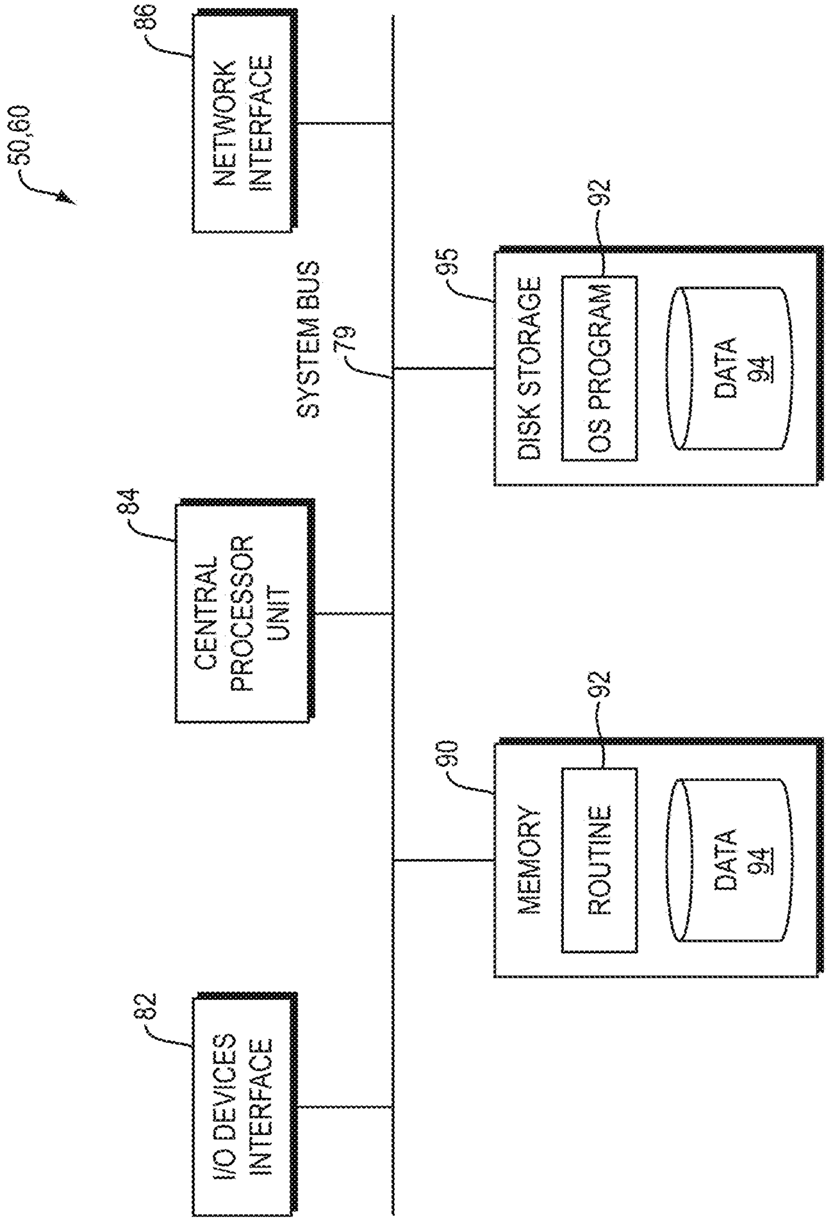
FIG. 15 is a block diagram of the internal structure of a computer of the network of FIG. 14.

Continuing from FIG. 14, FIG. 15 is a diagram of the internal structure of a computer (e.g., client processor/device 50 or server computers 60) in the computer system of FIG. 14. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 1). Memory 90 provides volatile storage for computer software instructions 92 and data 94 used to implement components of the encoding/decoding features of the present inventions. Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In the context of this document, a computer readable storage medium may be any tangible medium that can contain, or store a program for use by or in connection with an instruction execution system, apparatus, or device. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Any combination of one or more computer readable medium(s) may be utilized. The computer readable medium may be a computer readable signal medium or a computer readable storage medium.

Computer program code for carrying out operations for aspects of the present invention may be written in any combination of one or more programming languages, including JavaSpript, XML, Java, Smalltalk, C++, C# or the like and conventional procedural programming languages, such as the "C" programming language or similar programming languages. The program code may execute entirely on the user's computer as a browser plugin, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed.

While this invention has been particularly shown and described with references to example embodiments thereof, it will be understood by those skilled in the art that various changes in form and details may be made therein without departing from the scope of the invention encompassed by the appended claims. The terminology used herein was chosen to best explain the principles of the embodiments, the practical application or technical improvement over technologies found in the marketplace, or to enable others of ordinary skill in the art to understand the embodiments disclosed herein. For example, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Further, although Unified Modeling Language (UML) drawings (e.g. use case diagrams, etc.) have been used in some of the figures to model and/or describe example features of the inventions described herein, these drawings are for purposes of illustration and do not constrain the implementation of the inventions to any particular hardware or software implementations.

The service provider 104 can be, for example, any type of service provider that hosts electronic documents. Example service providers may include news/media service providers, such as CNET, or any social networking service providers, such as Facebook, Twitter, LinkedIn, and the like. Further, although certain embodiments herein use encryption keys/ciphers, one skilled in the art of cryptology would understand that other forms of encryption processes can be used, such as codebook based encryption. Further, it should be understood that content encoded using the systems of the present disclosure may be "nested" in that they may be encoded again to provide for additional protection.

Furthermore, although some figures have been described with reference to the viewer 110 and the publisher 102, one skilled in the art would understand that in some situations, the viewer 110 and the publisher 102 nodes may be operated by the same user.

While this invention has been particularly shown and described with references to example embodiments thereof, it will be understood by those skilled in the art that various changes in form and details may be made therein without departing from the scope of the invention encompassed by the appended claims.

What is claimed is:

1. A method of controlling digital content, the method comprising:

executing code by a first user node executing code stored in a non-transitory memory to control the digital content by:

receiving a request to publish digital text content received at an input field in an electronic document, where the publishing request is associated with the first user node;

in response to the publishing request, determining whether to encrypt the input field text content in the electronic document;

receiving instructions to replace, in the electronic document, the input field text content with an encrypted version of the input field text content based on an encryption policy defined by a controlling entity and prior to uploading the input field text content to web service, wherein the controlling entity includes a policy node that is separate from the first user node;

accessing the policy node;

obtaining the encryption policy and an encryption key from the policy node;

encrypting the input field text content with the encryption key to generate encrypted input field text content;

tagging the encrypted input field text content with a tag that includes an address of the policy node and an identifier of the encryption policy to allow the web service to extract the address of the policy node and the identifier of the encryption policy and obtain a decryption key to decrypt the encrypted input field text content; and uploading the encrypted input field text content and the tag to the web service.

2. The method of controlling digital content as in claim 1 wherein receiving a request to publish digital content received at an input field in an electronic document further includes:

detecting a change event associated with the input field; and upon detection of the change event, requesting, from the policy node, the encryption policy to be associated with the input field text content.

3. The method of controlling digital content as in claim 1 wherein determining whether to encrypt the input field text content in the electronic document is facilitated by a privacy agent executing on the first user node, the privacy agent transmitting, to the policy node, session information concerning the first user node and a unique identifier associated with the input field text content.

4. The method of controlling digital content as in claim 3 wherein the policy node responds to the session information and the unique identifier by:

generating the decryption key for decoding the encrypted version of the input field text content; and determining the policy for the input field text content, the policy defining conditions on which the input field text content is accessible to other viewing nodes.

5. The method of controlling digital content as in claim 1 wherein to replace, in the electronic document, the input field text content with an encrypted version of the input field text content further includes:

accessing a document object model (DOM) tree associated with the electronic document to modify and replace instances of the input field text content with the encoded version of the input field text content; and directing a browser to draw the modified electronic document.

6. The method of controlling digital content as in claim 1 wherein the first user node is associated with a first user account.

7. The method of controlling digital content as in claim 6 wherein the controlling entity is one of the following: an enterprise, organization, government entity, or guardian.

8. The method of controlling digital content as in claim 6 wherein the controlling entity is not the first user node, and the controlling entity is not a user operating the first user node.

9. The method of controlling digital content as in claim 6 wherein the controlling entity defines the encryption policy associated with the input field text content in the electronic document, and the controlling entity is associated with an administrative account configured to have preemptive control over encrypting and decrypting decisions associated with input field text content input at external sites by the first user node.

10. The method of controlling digital content as in claim 6 wherein the controlling entity defines the encryption policy associated with the input field text content, the encryption policy is configured to define which users or group of users have access to the decryption key that facilitates decoding of the encoded version of the input field content.

11. The method of controlling digital content as in claim 6 wherein the first user account is associated with a minor and the controlling entity's account is associated with a guardian of the minor.

12. The method of controlling digital content as in claim 1 wherein creation of the minor's account spawns creation of the guardian's account.

13. The method of controlling digital content as in claim 9 wherein the encryption policy is configured to specify a least one group, having one or more users, that is permitted to access a decrypted version of the encoded input field text content.

14. The method of controlling digital content as in claim 13 wherein the existence of the controlling entity's account and the control that it has over the first user's account is undetectable by the one or more users in the group.

15. The method of controlling digital content as in claim 9 wherein the controlling entity's account is configured to have the option to eject or suspend the first user's account.

16. The method of controlling digital content as in claim 8 wherein the encryption policy is configured such that publishing requests made by the first user's account are encrypted during a specified timeframe.

17. The method of controlling digital content as in claim 9 wherein the encryption policy is configured so that the first user's account controls encryption and decryption decisions during a specified timeframe.

18. The method of controlling digital content as in claim 9 wherein:

the encryption policy is configured to allow the controlling entity to control the encryption status of the input field text content if the publishing request is received during working hours; and the encryption policy is configured to allow the first user's account to control the encryption status of the input field text content if the publishing request is received during non-working hours.

19. The method of controlling digital content as in claim 1 wherein the controlling entity is configured to control encryption permissions associated with publishing requests made by accounts of a first domain, where the first user node's account is associated with the first domain.

20. The method of controlling digital content as in claim 1 wherein the controlling entity has the ability to access analytics information associated with content published by the first user node.

* * * * *